US012523467B2

(12) United States Patent
Patel et al.

(10) Patent No.: US 12,523,467 B2
(45) Date of Patent: Jan. 13, 2026

(54) SYSTEMS AND METHODS FOR DETERMINING SPACE AVAILABILITY IN AN AIRCRAFT

(71) Applicant: The Boeing Company, Arlington, VA (US)

(72) Inventors: Amar Patel, Arlington, VA (US); Vinutha Patel, Arlington, VA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/758,600

(22) Filed: Jun. 28, 2024

(65) Prior Publication Data

US 2024/0353223 A1    Oct. 24, 2024

Related U.S. Application Data

(63) Continuation of application No. 17/969,771, filed on Oct. 20, 2022, now Pat. No. 12,050,099, which is a
(Continued)

(51) Int. Cl.
*G01B 11/25* (2006.01)
*B64D 45/00* (2006.01)
(Continued)

(52) U.S. Cl.
CPC ......... *G01B 11/2513* (2013.01); *B64D 45/00* (2013.01); *B64F 5/60* (2017.01); *G06T 7/521* (2017.01); *G08G 5/00* (2013.01)

(58) Field of Classification Search
CPC ......... G01B 11/2513; B64F 5/60; B60Q 9/00; B60Q 5/00; G08G 5/00; B64D 45/00
See application file for complete search history.

(56) References Cited

U.S. PATENT DOCUMENTS 6,964,481 B2 * 11/2005 Pho .................. B64D 11/00151
353/42
7,081,713 B2    7/2006 Jurs et al.
(Continued)

FOREIGN PATENT DOCUMENTS

EP    3 173 329    5/2017
EP    3 348 958    7/2018

OTHER PUBLICATIONS

Extended European Search Report prepared by the European Patent Office in application No. EP 21 15 1841.0 dated Jun. 28, 2021.

*Primary Examiner* — Hoi C Lau
(74) *Attorney, Agent, or Firm* — COATS & BENNETT, PLLC

(57) ABSTRACT

An example method for determining space availability in an aircraft includes receiving outputs from a plurality of laser sensors positioned in a baggage container at a first wall and a second wall, and the first wall and the second wall face each other. The plurality of laser sensors emit signals within the baggage container and detect reflected responses to generate the outputs. The example method also includes receiving images from a camera positioned on a third wall of the baggage container, wherein the third wall differs from the first wall and the second wall, mapping contents of the baggage container based on the outputs from the plurality of laser sensors, based on said mapping, outputting data indicative of occupied space in the baggage container, and associating the images from the camera with the contents of the baggage container.

20 Claims, 17 Drawing Sheets

Related U.S. Application Data continuation-in-part of application No. 17/220,378, filed on Apr. 1, 2021, now Pat. No. 11,499,820, which is a continuation of application No. 16/797,061, filed on Feb. 21, 2020, now Pat. No. 10,996,051.

(51) Int. Cl.
  *B64F 5/60* (2017.01)
  *G06T 7/521* (2017.01)
  *G08G 5/00* (2025.01)

(56) References Cited

U.S. PATENT DOCUMENTS

| | | | | |
|---|---|---|---|---|
| 7,588,211 | B2* | 9/2009 | Granzeier | B60R 7/04 244/118.5 |
| 8,930,088 | B2* | 1/2015 | Bauer | B64D 11/00 701/13 |
| 9,007,209 | B1* | 4/2015 | Ehrman | G06Q 10/08 340/568.1 |
| 9,745,064 | B2* | 8/2017 | Balasubramanian | B64D 45/0005 |
| 9,869,574 | B2* | 1/2018 | Nicks | B64D 11/003 |
| 10,189,406 | B1 | 1/2019 | Pozzi et al. | |
| 10,445,867 | B2* | 10/2019 | Glatfelter | G06T 19/20 |
| 10,621,715 | B2* | 4/2020 | Glatfelter | G06T 19/006 |
| 10,936,879 | B2* | 3/2021 | Ibrahim | B64D 11/003 |
| 10,984,522 | B2* | 4/2021 | Glatfelter | G06T 19/006 |
| 10,996,051 | B1* | 5/2021 | Patel | G06Q 50/40 |
| 11,072,436 | B1* | 7/2021 | Cabos | G06V 20/52 |
| 11,499,820 | B2* | 11/2022 | Patel | G01B 11/2513 |
| 11,858,653 | B2* | 1/2024 | Cabos | G06V 20/52 |
| 12,050,099 | B2* | 7/2024 | Patel | B64F 5/60 |
| 12,077,298 | B2* | 9/2024 | Dwaraganathan | E05B 47/0012 |
| 2005/0110952 | A1 | 5/2005 | Pho et al. | |
| 2005/0205763 | A1 | 9/2005 | Beck et al. | |
| 2006/0157620 | A1* | 7/2006 | Granzeier | B60R 7/04 244/129.1 |
| 2006/0278817 | A1 | 12/2006 | Pirkl | |
| 2008/0231415 | A1 | 9/2008 | Kobayashi | |
| 2010/0100225 | A1 | 4/2010 | Reed et al. | |
| 2014/0361149 | A1 | 12/2014 | Meinherz et al. | |
| 2015/0144772 | A1 | 5/2015 | Eble | |
| 2016/0109280 | A1* | 4/2016 | Tiu | G01F 17/00 702/173 |
| 2017/0152044 | A1* | 6/2017 | Balasubramanian | B64D 11/003 |
| 2017/0200203 | A1 | 7/2017 | Kingsbury et al. | |
| 2017/0254922 | A1 | 9/2017 | Burger et al. | |
| 2017/0283086 | A1* | 10/2017 | Garing | B64D 11/0638 |
| 2017/0328759 | A1* | 11/2017 | Nicks | B64D 45/00 |
| 2018/0018764 | A1* | 1/2018 | Glatfelter | G06T 19/006 |
| 2018/0173962 | A1* | 6/2018 | Ibrahim | H04N 7/181 |
| 2019/0005441 | A1* | 1/2019 | Savian | G06Q 10/08 |
| 2019/0213698 | A1* | 7/2019 | Savian | G06Q 10/02 |
| 2019/0233113 | A1 | 8/2019 | Carswell | |
| 2019/0264487 | A1 | 8/2019 | Zanolari | |
| 2019/0283880 | A1* | 9/2019 | Agarwala | B64D 11/0015 |
| 2019/0325356 | A1* | 10/2019 | Savian | G06Q 10/02 |
| 2019/0325538 | A1* | 10/2019 | Savian | G06Q 10/02 |
| 2020/0043158 | A1* | 2/2020 | Glatfelter | G05B 19/4183 |
| 2020/0084850 | A1 | 3/2020 | Eble | |
| 2020/0202513 | A1* | 6/2020 | Glatfelter | G06T 19/20 |
| 2021/0206508 | A1* | 7/2021 | Cabos | G06V 20/52 |
| 2021/0262788 | A1* | 8/2021 | Patel | G01S 17/89 |
| 2021/0347495 | A1* | 11/2021 | Cabos | G06V 20/52 |
| 2022/0063834 | A1* | 3/2022 | Cabos | G06V 10/70 |
| 2023/0039908 | A1* | 2/2023 | Patel | B64D 11/003 |
| 2024/0353223 | A1* | 10/2024 | Patel | G01B 11/2513 |

* cited by examiner

SYSTEMS AND METHODS FOR DETERMINING SPACE AVAILABILITY IN AN AIRCRAFT

CROSS REFERENCE TO RELATED APPLICATION

The present disclosure claims priority to and is a continuation of U.S. application Ser. No. 17/969,771, filed on Oct. 20, 2022 (now U.S. Pat. No. 12,050,099), which claims priority to and is a continuation-in-part of U.S. application Ser. No. 17/220,378, filed on Apr. 1, 2021 (now U.S. Pat. No. 11,499,820), which claims priority to and is a continuation of U.S. application Ser. No. 16/797,061, filed on Feb. 21, 2020 (now U.S. Pat. No. 10,996,051), the entire contents of each of which are herein incorporated by reference.

FIELD

The present disclosure relates generally to determining space availability in an aircraft, and more particularly to mapping contents of baggage containers based on outputs from laser sensors.

BACKGROUND

Aircraft scheduling and high utilization is desirable. Boarding processes can be time consuming with a large number of passengers boarding with carry-on luggage. In aircraft, cabin baggage space is limited, and generally, current processes are random and include a first-come first-serve basis. Overhead bins in aircraft can have variable amounts of open space based on types and sizes of baggage placed in the bins.

Currently, crew members typically manually look to find open space within overhead bins for passengers as the aircraft fills up. This process can become time consuming and slow down the boarding process.

SUMMARY

In an example, a system for determining space availability in an aircraft is described. The system comprises a plurality of laser sensors configured to be positioned in a baggage container at a first wall and a second wall, and the first wall and the second wall face each other. The plurality of laser sensors emit signals within the baggage container and detect reflected responses to generate outputs. The system also comprises one or more processors in communication with the plurality of laser sensors for executing instructions stored in non-transitory computer readable media to perform functions including receiving the outputs from the plurality of laser sensors, mapping contents of the baggage container based on the outputs from the plurality of laser sensors, and based on said mapping, outputting data indicative of occupied space in the baggage container.

In another example, a method for determining space availability in an aircraft is described. The method comprises receiving outputs from a plurality of laser sensors positioned in a baggage container at a first wall and a second wall, and the first wall and the second wall face each other. The plurality of laser sensors emit signals within the baggage container and detect reflected responses to generate the outputs. The method also comprises mapping contents of the baggage container based on the outputs from the plurality of laser sensors, and based on said mapping, outputting data indicative of occupied space in the baggage container.

In another example, a non-transitory computer-readable media is described having stored therein executable instructions, which when executed by a computing device having one or more processors causes the computing device to perform functions. The functions comprise receiving outputs from a plurality of laser sensors positioned in a baggage container of an aircraft at a first wall and a second wall of the baggage container, and the first wall and the second wall face each other. The plurality of laser sensors emit signals within the baggage container and detect reflected responses to generate the outputs. The functions also comprise mapping contents of the baggage container based on the outputs from the plurality of laser sensors, and based on said mapping, outputting data indicative of occupied space in the baggage container.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Cabin baggage space in aircrafts are limited and it is important to use the space in a methodical way. Current processes are random and a first-come-first-serve basis. Unavailability of room for cabin bags can cause customer grievance and confusion before take-off. Examples described herein utilize a sensor-visualization system and method for determining space availability in an aircraft. For example, a system is described that utilizes a plurality of laser sensors configured to be positioned in a baggage container at a first wall and a second wall. The plurality of laser sensors emit signals within the baggage container and detect reflected responses to generate sensor outputs. A processor in communication with the plurality of laser sensors receives the outputs from the plurality of laser sensors, maps contents of the baggage container based on the outputs from the plurality of laser sensors, and based on said mapping, outputs data indicative of occupied space in the baggage container.

Other types of sensors are used, in other examples, to generate a different form of sensor outputs that are processed by the processor as well. Such other types of outputs include image data, voltage outputs representative of factors detected or measured by a sensor, and combinations of such outputs.

The systems and methods described herein will provide improved customer experience, easy access of baggage space availability for crew and passengers, and add safety features to avoid excess loading of baggage space.

Figure 1:
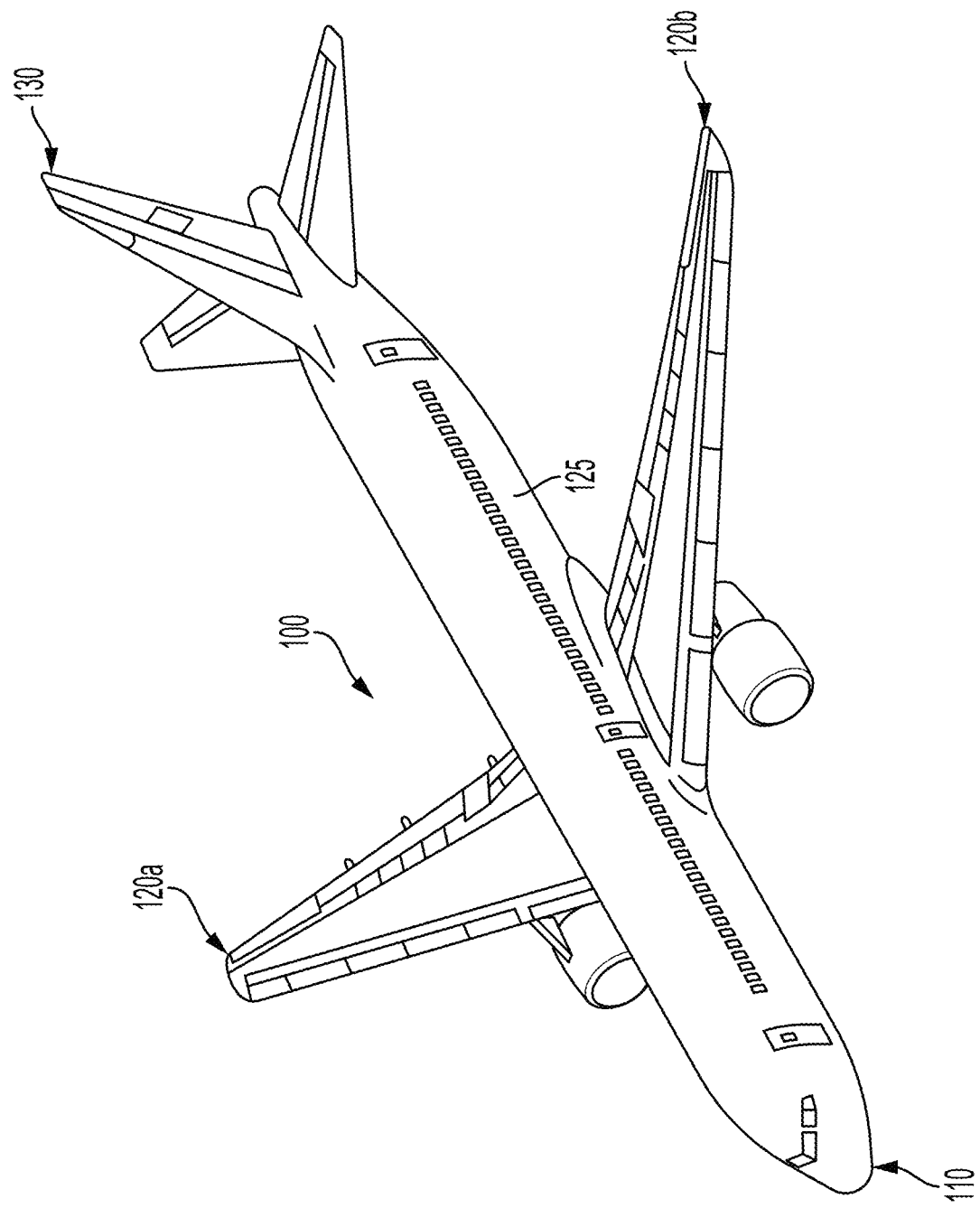
FIG. 1 illustrates an aircraft that includes a nose, wings, a fuselage, and a tail, according to an example implementation.

Referring now to the figures, FIG. 1 illustrates an aircraft 100 that includes a nose 110, wings 120*a-b*, a fuselage 125, and a tail 130, according to an example implementation. The aircraft 100 includes many areas arranged for storage of items during flight. In one example, the fuselage 125 includes storage underneath a passenger compartment for storing luggage and other items or supplies. In another example, the passenger compartment in the fuselage 125 includes overhead bins and under seat areas for storing further items.

Figure 2:
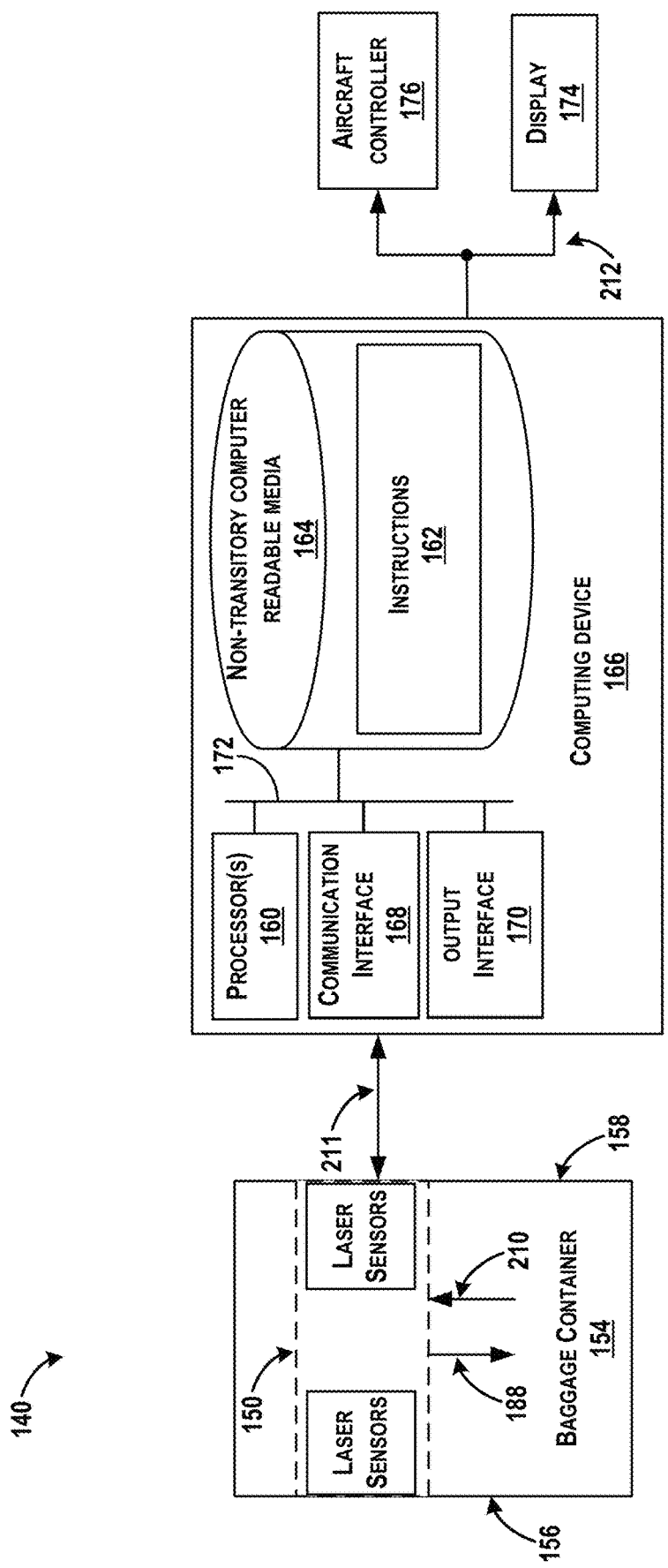
FIG. 2 illustrates a block diagram of a system for determining space availability in the aircraft, according to an example implementation.

FIG. 2 illustrates a block diagram of a system 140 for determining space availability in the aircraft 100, according to an example implementation. In FIG. 2, the system 140 includes a plurality of laser sensors 150 configured to be positioned in a baggage container 154 at a first wall 156 and a second wall 158, and the first wall 156 and the second wall 158 face each other. The plurality of laser sensors 150 emit signals 188 within the baggage container 154 and detect reflected responses 210 to generate outputs 211. The system also includes one or more processors 160 in communication with the plurality of laser sensors 150 for executing instructions 162 stored in non-transitory computer readable media 164 to perform functions including receiving the outputs from the plurality of laser sensors 150, mapping contents of the baggage container 154 based on the outputs from the plurality of laser sensors 150, and based on said mapping, outputting data 212 indicative of occupied space in the baggage container 154.

The system 140 can be included on the aircraft 100 or in an interior of the aircraft 100, although the aircraft 100 itself may not be a component of the system 140. Thus, the system 140 can be a stand-alone component separate from the aircraft 100, and the system 140 includes multiple elements, at least some of which may be located or positioned on or within the aircraft 100, for example. In some other examples, at least some of the components of the system 140 may be positioned in a ground-control system as well, such as the components for processing and analyzing outputs of the plurality of laser sensors 150.

In FIG. 2, the system 140 is shown to include a computing device 166 that houses the processors 160. The computing device 166 may be located on-board the aircraft 100 or within a ground computing system as well. To perform the functions noted above, the computing device 166 includes a communication interface 168, an output interface 170, and each component of the computing device 166 is connected to a communication bus 172. The computing device 166 may also include hardware to enable communication within the computing device 166 and between the computing device 166 and other devices (not shown). The hardware may include transmitters, receivers, and antennas, for example.

The communication interface 168 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 168 may be configured to receive input data from one or more devices, and may also be configured to send output data to other devices.

The non-transitory computer readable media 164 may include or take the form of memory, such as one or more computer-readable storage media that can be read or accessed by the one or more processors 160. The computer-readable storage media can include volatile and/or non-volatile storage components, such as optical, magnetic, organic or other memory or disc storage, which can be integrated in whole or in part with the one or more processors 160. The non-transitory computer readable media 164 is considered non-transitory computer readable media. In some examples, the non-transitory computer readable media 164 can be implemented using a single physical device (e.g., one optical, magnetic, organic or other memory or disc storage unit), while in other examples, the non-transitory computer readable media 164 can be implemented using two or more physical devices.

The non-transitory computer readable media 164 thus is a computer readable medium, and the instructions 162 are stored thereon. The instructions 162 include computer executable code.

The one or more processors 160 may be general-purpose processors or special purpose processors (e.g., digital signal processors, application specific integrated circuits, etc.). The one or more processors 160 may receive inputs from the communication interface 168 as well as outputs from other sensors (e.g., the plurality of laser sensors 150), and process them to generate outputs that are stored in the non-transitory computer readable media 164. The one or more processors 160 can be configured to execute the instructions 162 (e.g., computer-readable program instructions) that are stored in the non-transitory computer readable media 164 and are executable to provide the functionality of the computing device 166 described herein.

The output interface 170 outputs information for reporting or storage, and thus, the output interface 170 may be similar to the communication interface 168 and can be a wireless interface (e.g., transmitter) or a wired interface as well.

The computing device 166 and/or the processors 160 can output data indicative of the occupied space in the baggage container 154 to a display 174. The display 174 may be located in a number of areas, such as on the baggage container 154, near crew members, or on a control board of the aircraft 100.

The computing device 166 and/or the processors 160 can additionally or alternatively output data indicative of the occupied space in the baggage container 154 to an aircraft controller 176. The aircraft controller 176 may include a computing device and can be programmed to perform functions based on the space availability in the baggage container 154. Example functions include providing an audio information notice of space availability including use of speakers in the cabin of the aircraft, causing door(s) of the baggage container to close when no further space availability, or still other functions.

Although FIG. 2 illustrates only one baggage container, the system 140 may include the plurality of laser sensors 150 configured to be positioned in multiple baggage containers.

The computing device 166 can then process outputs of the plurality of laser sensors 150 to determine space availability in each of the different baggage containers.

Figure 3:
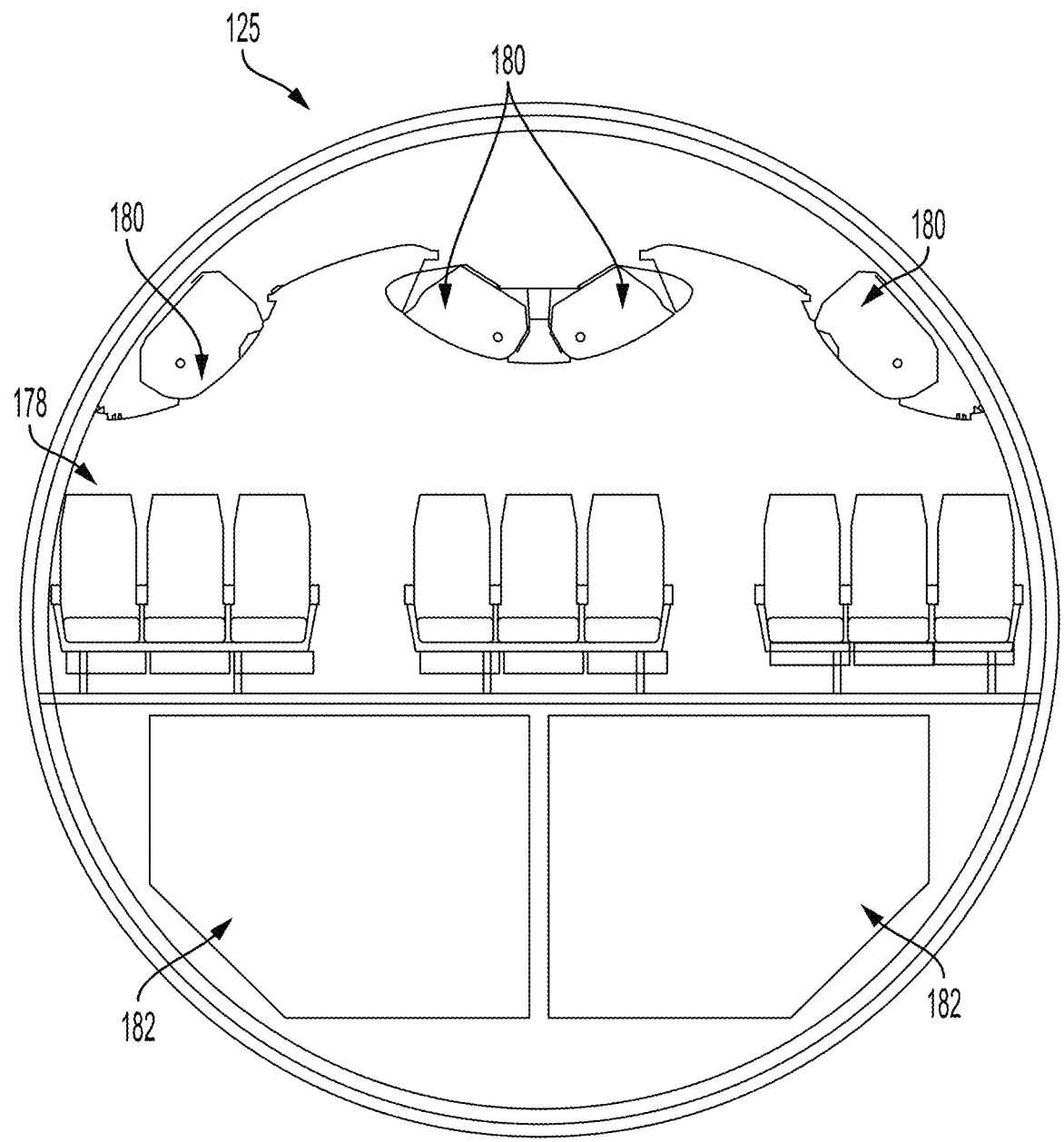
FIG. 3 illustrates a cross-sectional view of the fuselage looking aft, according to an example implementation.

FIG. 3 illustrates a cross-sectional view of the fuselage 125 looking aft, according to an example implementation. As mentioned above, the fuselage 125 has a passenger compartment including seating 178 for passengers. In the passenger compartment, the baggage container 154 (shown in FIG. 2) takes the form of an overhead bin 180 in the aircraft 100. Typically, many overhead bins are included, such as one per row or one per multiple rows of the seating 178. In addition, multiple overhead bins are typically included on each side of an aisle between the seating 178, as shown in FIG. 3.

FIG. 3 also illustrates additional storage compartments 182 underneath the passenger compartment. In FIG. 3, the baggage container (shown in FIG. 2) alternatively or additionally takes the form of the additional storage compartments 182 for storage of items. For example, passengers may check luggage and other items for travel, which can be positioned in the additional storage compartments 182 for travel.

Furthermore, the baggage container 154 may be included or positioned in other areas of the fuselage 125 or in other areas of the aircraft 100 as well.

Figure 4:
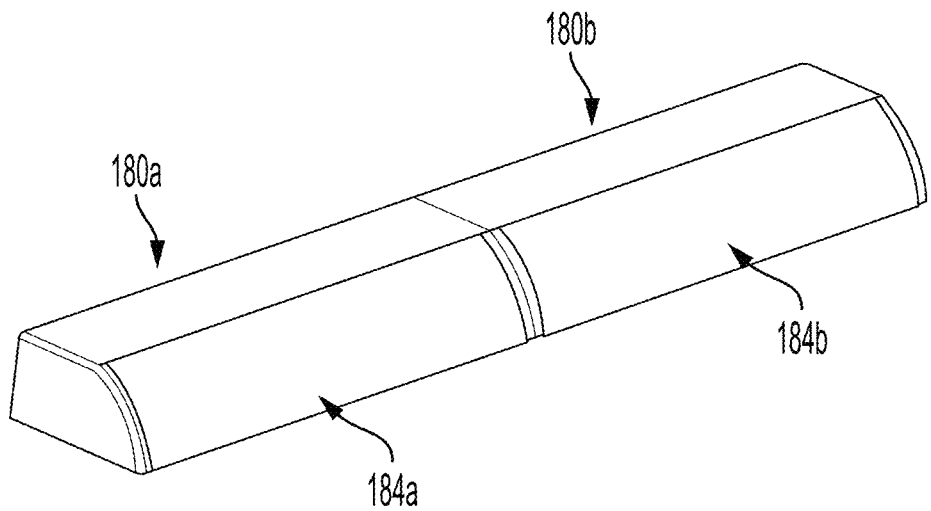
FIG. 4 illustrates an example of the overhead bins, according to an example implementation.

FIG. 4 illustrates an example of the overhead bin 180, shown as overhead bins 180a-b, according to an example implementation. The overhead bins 180a-b include doors 184a-b, which can be manually opened and closed, and in FIG. 4 the doors 184a-b are shown in a closed position.

Figure 5:
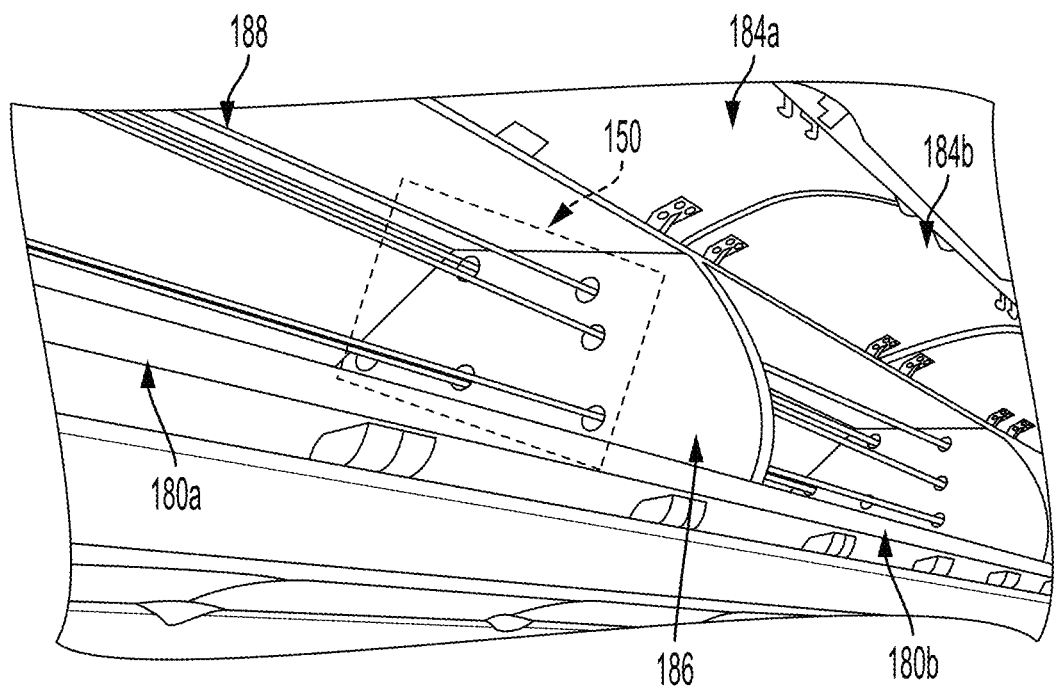
FIG. 5 illustrates an example of the overhead bins with the doors in an open position, according to an example implementation.

FIG. 5 illustrates an example of the overhead bins 180a-b with the doors 184a-b in an open position, according to an example implementation. Inside the overhead bins 180a-b, the plurality of laser sensors 150 are shown to be positioned at a wall 186 of the overhead bins 180a-b. The plurality of laser sensors 150 emit signals 188, such as laser beams, within the overhead bins 180a-b. The plurality of laser sensors 150 may be positioned so as not to be in a line-of-sight of a user or passenger, for example.

Figure 6:
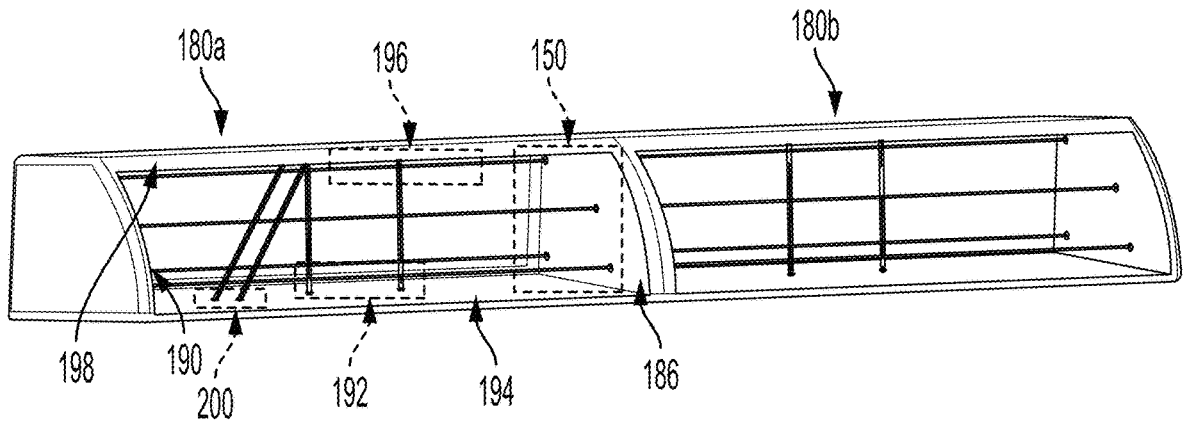
FIG. 6 illustrates another example of the overhead bins with the doors in an open position, according to an example implementation.

FIG. 6 illustrates another example of the overhead bins 180a-b with the doors 184a-b in an open position, according to an example implementation. In FIG. 6, the plurality of laser sensors 150 are shown positioned on the wall 186, which may be considered the first wall 156 (as shown in FIG. 2). Additional laser sensors are positioned in the overhead bin 180a at the opposite wall 190, which may be considered the second wall 158 (as shown in FIG. 2). The wall 186 and the opposite wall 190 face each other. In this configuration, the plurality of laser sensors 150 are positioned to emit the signals within the overhead bins 180a in a horizontal direction.

The overhead bin 180a also may include a second plurality of laser sensors 192 positioned at a base 194 of the overhead bin 180a, and the second plurality of laser sensors 192 are positioned to emit the signals within the overhead bins 180a in a vertical direction, or in a direction perpendicular to the direction of emission of signals by the plurality of laser sensors 150.

The overhead bin 180a may also include a third plurality of laser sensors 196 positioned in the overhead bin 180a at a ceiling 198 of the overhead bin 180a, and the third plurality of laser sensors 196 are positioned to emit the signals within the overhead bins 180a in a vertical direction, or in a direction perpendicular to the direction of emission of signals by the plurality of laser sensors 150.

Still further, the overhead bin 180a may also include a fourth plurality of laser sensors 200 positioned in the overhead bin 180*a* to emit signals within the overhead bin 180*a* at an angle offset from a horizontal direction, as shown in FIG. 6.

Thus, the plurality of laser sensors 150, the second plurality of laser sensors 192, the third plurality of laser sensors 196, and the fourth plurality of laser sensors 200 generate a laser beam grid within the baggage container. Not all groupings of laser sensors are required to generate the grid, however, and less laser sensors can be utilized depending on size and configuration of the baggage container, for example.

Figure 7:
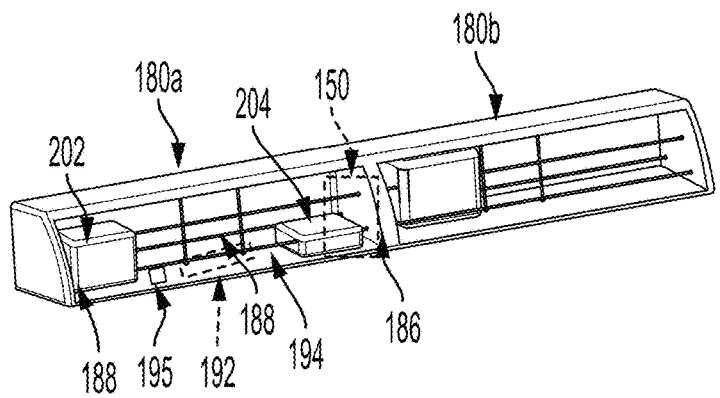
FIG. 7 illustrates another example of the overhead bins with the doors in an open position and with contents positioned inside the overhead bins, according to an example implementation.

FIG. 7 illustrates another example of the overhead bins 180*a-b* with the doors 184*a-b* in an open position and with contents positioned inside the overhead bins 180*a-b*, according to an example implementation. For example, a container 202 and a briefcase 204 are positioned inside the overhead bin 180*a*. The plurality of laser sensors 150 (and other groups of laser sensors, if present, such as the second plurality of laser sensors 192) emit signals within the overhead bin 180*a* and detect reflected responses to generate outputs.

Within examples, the plurality of laser sensors 150 (and other groups of laser sensors, if present, such as the second plurality of laser sensors 192) are activated at times before take-off and after landing of the aircraft to reduce power consumption while in-flight. Activation and deactivation of the system 140 can be manual by crew members. In some examples, the processors 160 can also receiving a weight on wheel sensor output (e.g., from a control system of the aircraft that is indicative of the aircraft being on ground), and based on the weight on wheel sensor output, the processors 160 activate or deactivate the plurality of laser sensors 150. For example, when the weight on wheel sensor output indicates that the aircraft is on ground, the plurality of laser sensors 150 are activated, and when the weight on wheel sensor output indicates that the aircraft is in air, the plurality of laser sensors 150 are deactivated.

In further examples, the overhead bins 180*a-b* and include sensors coupled to the doors 184*a-b* or to latches of the doors, and the processors 160 can activate (or deactivate) the plurality of laser sensors 150 only when the doors 184*a-b* are open. Such sensors may alternatively be decoupled from the doors 184*a-b*, and can include light sensors, so that when the doors 184*a-b* are closed, the light sensors provide outputs to the processors 160 that can be processed to determine if the doors 184*a-b* are closed.

Within one example, in operation, when the instructions 162 are executed by the one or more processors 160 of the computing device 166, the one or more processors 160 are caused to perform functions for receiving the outputs from the plurality of laser sensors 150 (and other groups of laser sensors, if present, such as the second plurality of laser sensors 192), and mapping contents of the overhead bin 180*a* based on the outputs from the plurality of laser sensors 150. In this example, the plurality of laser sensors 150 can measure distance to an object by illuminating the object with laser light and measuring reflected light with a sensor. Then, differences in laser return times and wavelengths can be used to generate digital representations of the object. For example, distance to the object is determined by recording the time between transmitted and backscattered laser pulses and by using the speed of light to calculate the distance traveled. Mapping contents of the overhead bin 180*a* may be performed using known techniques and standards as well, such as light detection and ranging (LIDAR) sensors, for example. Mapping contents of the overhead bin 180*a* includes determining a positional arrangement of the contents in the overhead bin 180*a*, and positional relationships between the contents as well.

The mapping can be performed by further processing the outputs from the plurality of laser sensors 150, the outputs from the second plurality of laser sensors 192, the outputs from the third plurality of laser sensors 196, the outputs from the fourth plurality of laser sensors 200, or from outputs based on the laser beam grid.

In still further examples, one or more weight sensors 195 may be positioned at the base 194 of the overhead bin 180*a* (or baggage container) for providing an output to the one or more processors 160 indicative of presence of an object in the overhead bin 180*a*. The mapping of the contents of the overhead bin 180*a* can then alternatively or additionally be based on the output from the one or more weight sensors 195.

Following, based on the mapping, the one or more processors 160 output data indicative of occupied space in the overhead bin 180*a*.

Figure 8:
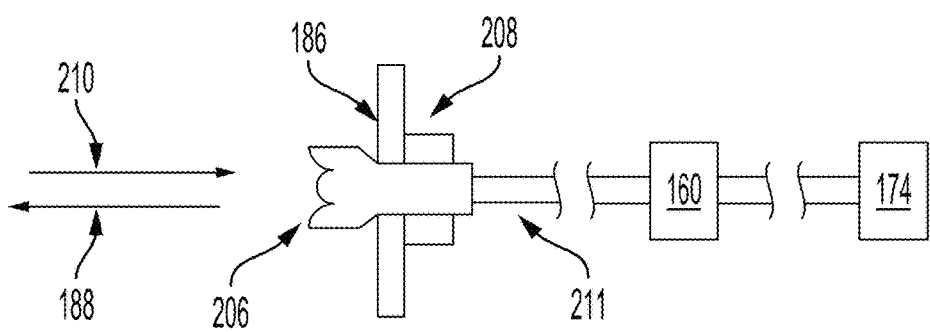
FIG. 8 illustrates a block diagram of an example operation of a laser sensor, according to an example implementation.

FIG. 8 illustrates a block diagram of an example operation of a laser sensor, according to an example implementation. In FIG. 8, a laser sensor 206 (e.g., emitter diode) is positioned in the wall 186 using a retainer 208. For example, the laser sensor 206 can be attached or may be fastened to the wall 186 by threads and the retainer 208 may be a nut to secure the laser sensor 206 to the wall 186. The laser sensor 206 emits a signal, such as the laser beam, and detects reflected responses, such as reflected response 210. The reflected response 210 may be generated by the laser beam hitting an object (e.g., the briefcase 204). The laser sensor 206 provides an output 211 to the processors 160, via wires or via a wireless output (when a transmitter is coupled to the laser sensor 206), and the processor 160 generates the mapping of contents in the overhead bin 180*a*. The processors 160 then can provide the data indicative of occupied space in the overhead bin 180*a* to the display 174, for example.

Figure 9:
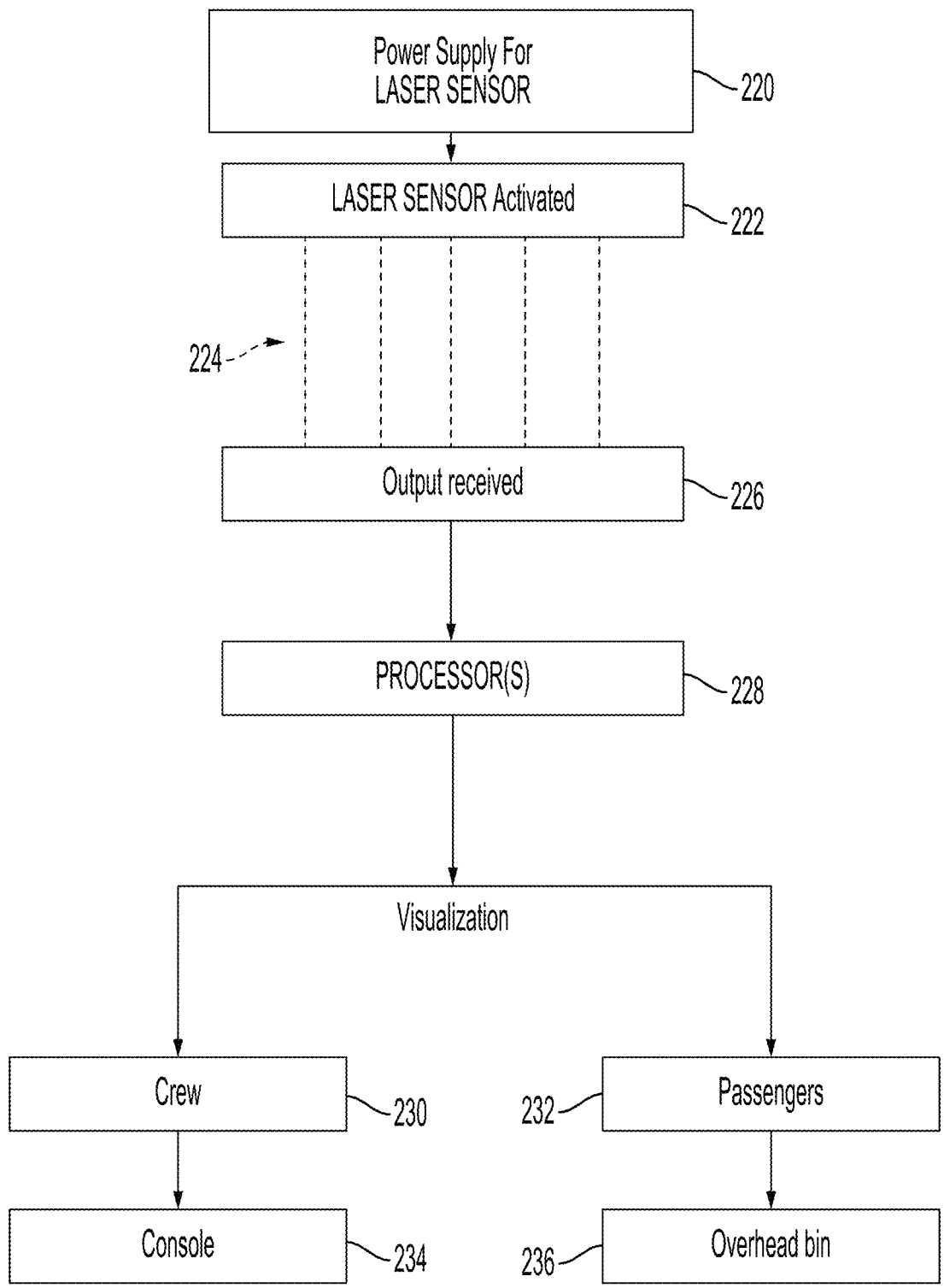
FIG. 9 is a block diagram illustrating a flowchart of example operation of the laser sensor, according to an example implementation.

FIG. 9 is a block diagram illustrating a flowchart of example operation of the laser sensor 206, according to an example implementation. Initially, a power supply of the laser sensor 206 is coupled to the laser sensor 206, and the laser sensor is activated, as shown at blocks 220 and 222. One or more laser beams 224 are emitted, and outputs (e.g., reflected responses) are received, as shown at block 226. The laser sensor 206 then provides an output to the processors 160, at block 228, and the processors 160 generate data indicative of occupied space in the overhead bin 180*a* for visualization to crew members (at block 230) and to passengers (at block 232). Visualization to the crew members can be via a console, as shown at block 234. Visualization to the passengers can be via a display on the overhead bin 180*a*, as shown at block 236.

In sum, the laser beams from the laser sensor 206 (and from all sensors of the plurality of laser sensors) pass through the overhead baggage bins, and the laser sensors in turn capture information of baggage in each compartment, measure dimensions of the baggage, and provide outputs to the processors to analyze space availability. Information representing the space availability can be illustrated in real time on a digital monitor, for example.

Figure 10:
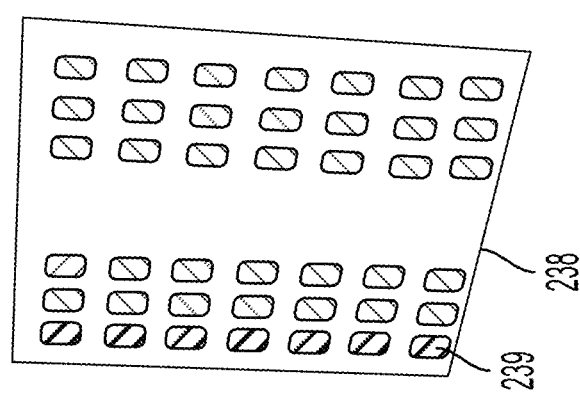
FIG. 10 is a conceptual illustration of a crew member and a console, according to an example implementation.
Figure 10:
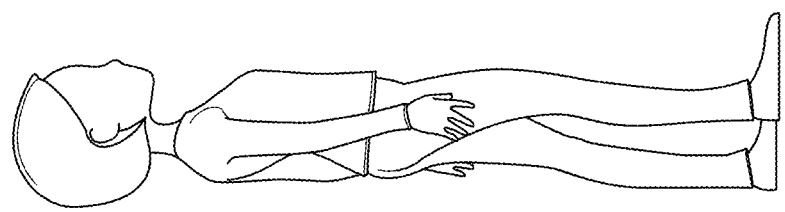

FIG. 10 is a conceptual illustration of a crew member and a console 238, according to an example implementation. The console 238 may be a digital monitor, and can include a graphical user interface or graphical depictions of seating in the aircraft and associated overhead bins per seating or seat number. Different colors or graphical indicators 239 can be used to represent occupied space vs. available space in each individual overhead bin, for example.

In some examples, the console 238 can be included on a handheld portable device carried by crew members, for example.

The console 238 can also be useful to assist with passengers exiting the aircraft to determine if all baggage has been claimed by passengers. In an instance where a baggage is left behind, the crew members will have knowledge of contents of the baggage containers and can determine which containers, if any, still include objects.

Figure 11:
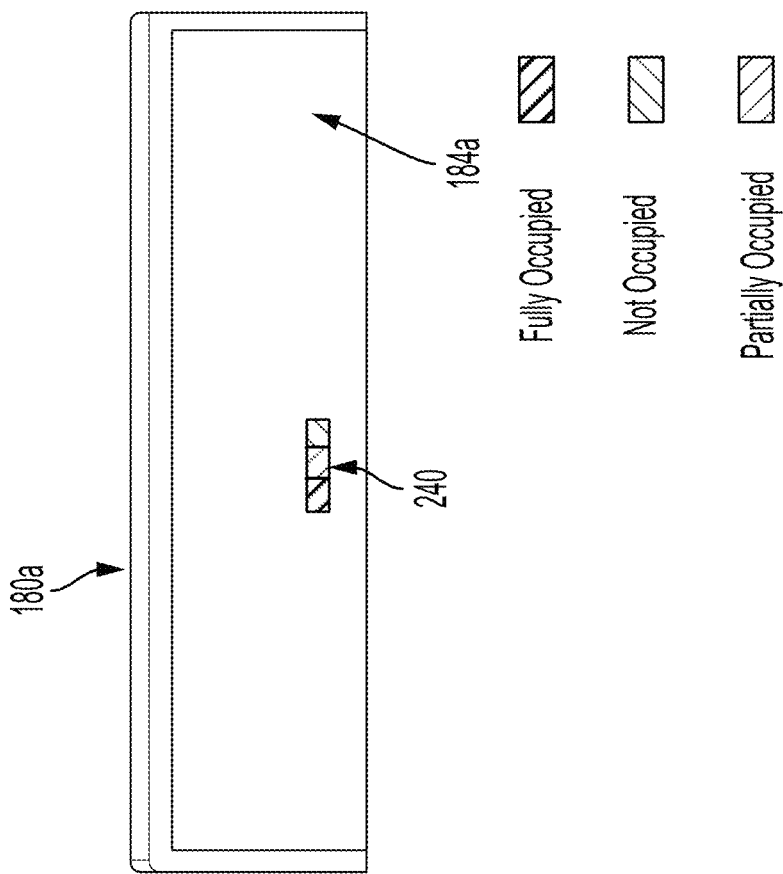
FIG. 11 is an illustration of the overhead bin with a display, according to an example implementation.

FIG. 11 is an illustration of the overhead bin 180*a* with a display 240, according to an example implementation. The overhead bin has storage available per unit areas for multiple baggage (e.g., such as per individual seats in a row on the aircraft), and the data indicative of occupied space in the overhead bin 180*a* can be indicative of occupied space per unit area in the overhead bin 180*a*. Thus, the display 240 can be divided into three parts representative of the unit areas in the overhead bin 180*a*, and different colors can be used to represent space available, such as indicating fully occupied, not occupied, or partially occupied, for example.

Thus, the display 240 can be mounted proximal to the overhead bin 180*a* (or baggage container), such as on the door 184 or on other areas next to or adjacent to the overhead bin 180*a*. The display 240 can display one or more indicators of the occupied space in the baggage container on the display 240 based on the data indicative of occupied space in the baggage container.

In another example, the display 240 can display information including approximate amount of space unoccupied in the overhead bin 180*a* based on the data indicative of occupied space in the overhead bin 180*a*. The display 240 can be a digital monitor, and can thus display approximate dimensions of available space, for example. The display 240 may further illustrate information indicative of the occupied space in the overhead bin 180*a* per seat number where the overhead bin 180*a* is located in the aircraft.

Figure 12:
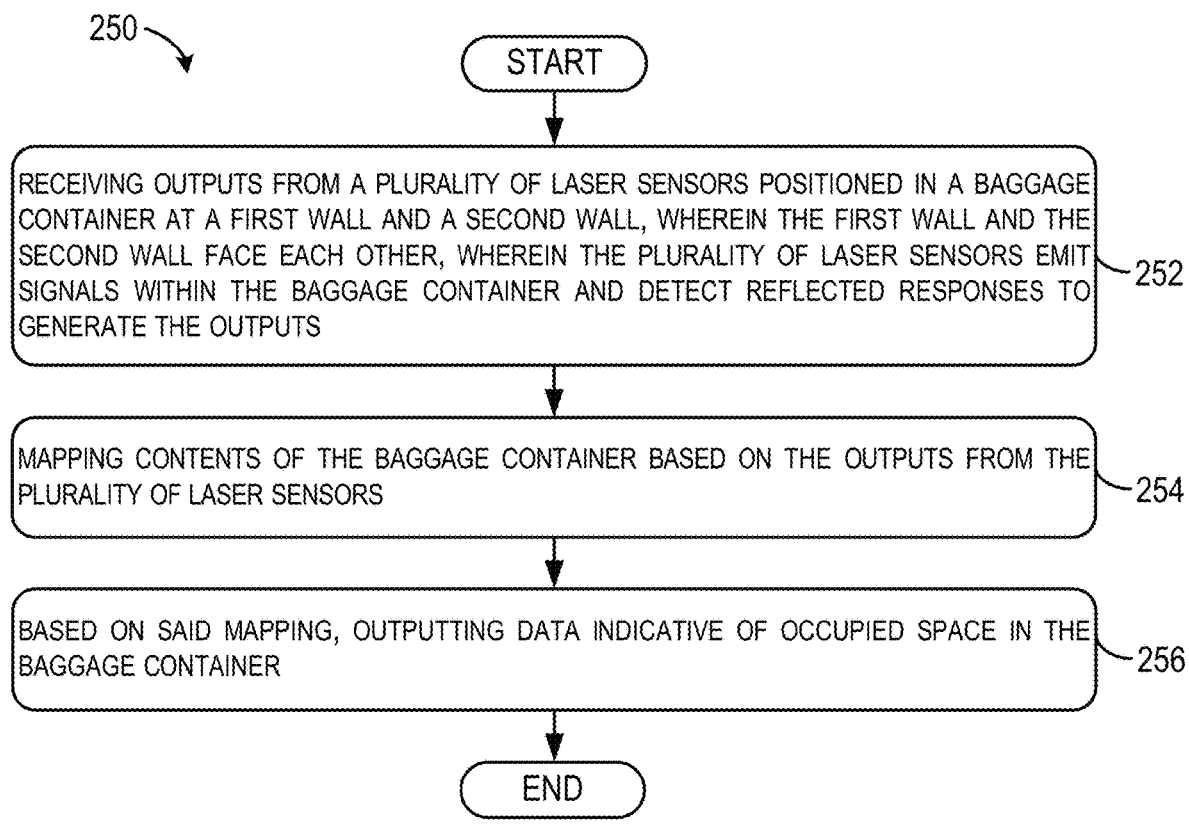
FIG. 12 shows a flowchart of an example of a method for determining space availability in an aircraft, according to an example implementation.

FIG. 12 shows a flowchart of an example of a method 250 for determining space availability in an aircraft, according to an example implementation. Method 250 shown in FIG. 12 presents an example of a method that could be used with the aircraft 100 shown in FIG. 1, with the system 140 shown in FIG. 2, or with the computing device 166 shown in FIG. 2, for example. Further, devices or systems may be used or configured to perform logical functions presented in FIG. 12. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 250 may include one or more operations, functions, or actions as illustrated by one or more of blocks 252-256. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 12, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 252, the method 250 includes receiving outputs from the plurality of laser sensors 150 positioned in the baggage container 154 at the first wall 156 and the second wall 158, and the first wall 156 and the second wall 158 face each other. The plurality of laser sensors 150 emit signals within the baggage container 154 and detect reflected responses to generate the outputs.

At block 254, the method 250 includes mapping contents of the baggage container 154 based on the outputs from the plurality of laser sensors 150.

In one example, the plurality of laser sensors 150 are positioned to emit the signals within the baggage container in a horizontal direction, and the method 250 includes receiving outputs from the second plurality of laser sensors 192 positioned in the baggage container 154 at a base of the baggage container 154 and the second plurality of laser sensors 192 are positioned to emit the signals within the baggage container 154 in a vertical direction, receiving outputs from the third plurality of laser sensors 196 positioned in the baggage container 154 at a ceiling of the baggage container 154 and the third plurality of laser sensors 196 are positioned to emit the signals within the baggage container 154 in a vertical direction, and the plurality of laser sensors 150, the second plurality of laser sensors 192, and the third plurality of laser sensors 196 generate a laser beam grid within the baggage container 154. In this example, mapping the contents of the baggage container 154 includes mapping the contents of the baggage container 154 based on the laser beam grid.

At block 256, the method 250 includes based on said mapping, outputting data indicative of occupied space in the baggage container 154. In one example, outputting the data indicative of occupied space in the baggage container 154 includes further includes outputting data indicative of unoccupied space in the baggage container 154.

In further examples, the method 250 can include determining dimensions of baggage in the baggage container 154 based on the outputs from the plurality of laser sensors 150. For example, a three-dimensional mapping of contents of the baggage container 154 can be performed, using traditional LIDAR and laser mapping techniques, to identify dimensions of baggage or items included in the baggage container 154 to assist with determination of additional available space. The dimensions of the baggage container 154 are known, and once dimensions of the baggage in the baggage container 154 are known, the available space will be the difference.

In further examples, the method 250 can includes displaying one or more indicators of the occupied space in the baggage container 154 on a display (e.g., the display 240) mounted proximal to the baggage container 154, based on the data indicative of occupied space in the baggage container 154.

In further examples, the system 140 includes additional sensors in the overhead bins 180*a-b*, each coupled to or in communication with the processors 160 to provide further outputs processed by the processors 160 accordingly.

Figure 13:
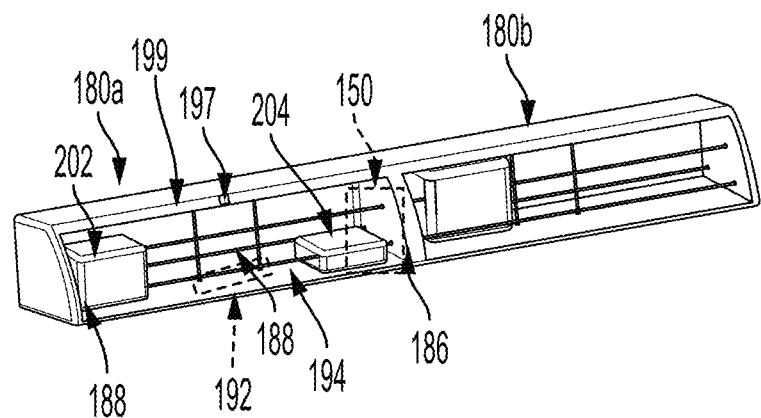
FIG. 13 illustrates another example of the overhead bins with the doors in an open position (and not shown) and with contents positioned inside the overhead bins, according to an example implementation.

FIG. 13 illustrates another example of the overhead bins 180*a-b* with the doors 184*a-b* in an open position (and not shown) and with contents positioned inside the overhead bins 180*a-b*, according to an example implementation. The plurality of laser sensors 150 (and other groups of laser sensors, if present, such as the second plurality of laser sensors 192) emit signals within the overhead bin 180*a* and detect reflected responses to generate outputs. In the example arrangement shown in FIG. 13, a camera is installed on each overhead bin 180*a-b*, shown for example on bin 180*a* in FIG. 13 as camera 197. Although FIG. 13 only illustrates one camera, more than one camera is arranged on walls of the overhead bins 180*a* in other examples, such as to arrange one or more additional cameras on other walls (e.g., internal walls of the overhead bin 180*a*) or facing alternate directions.

Within examples, the plurality of laser sensors 150 (and other groups of laser sensors, if present, such as the second plurality of laser sensors 192) are activated at same times as described above. The camera 197 is activate upon opening the bin 180*a*, for example. The overhead bins 180*a-b* include sensors coupled to the doors 184*a-b* or to latches of the doors, and the processors 160 can activate (or deactivate) the camera 197 only when the doors 184*a-b* are open. Such sensors may alternatively be decoupled from the doors 184*a-b*, and can include light sensors, so that when the doors 184*a-b* are closed, the light sensors provide outputs to the processors 160 that can be processed to determine the doors 184*a-b* are closed.

Within one example, in operation, when the instructions 162 are executed by the one or more processors 160 of the computing device 166, the one or more processors 160 are caused to perform functions for receiving the outputs from the camera 197 (when the doors 194*a-b* are open), and recording content at that time. The content that is recorded will include passengers placing baggage and items in the overhead bins 180*a-b* over time. In one example, such content is stored and enables an association of the baggage and items with the passengers to further assist with identifying baggage and items to passengers. In other examples, the digital images output by the camera 197 are processed by the processors 160 to determine occupied and unoccupied space in the overhead bin 180*a*.

In further examples, in operation, when the instructions 162 are executed by the one or more processors 160 of the computing device 166, the one or more processors 160 are caused to also perform functions for receiving the outputs from the plurality of laser sensors 150 (and other groups of laser sensors, if present, such as the second plurality of laser sensors 192), and mapping contents of the overhead bin 180*a* based on the outputs from the plurality of laser sensors 150. In this example, the processors 160 determine an item is positioned in the overhead bins 180*a-b* and determine a mapping of where the item is positioned in the overhead bins 180*a-b* based on outputs from the plurality of laser sensors 150, and then use the determination output from the processing of the outputs from the plurality of laser sensors 150 as a trigger to associate video content output from the camera 197 at that point in time with the position in the overhead bin 180*a-b*. In this manner, the baggage or item has been mapped to a position in the overhead bin 180*a-b* by using outputs of the plurality of laser sensors 150 and a point in time of the video content is mapped to the associated mapping of the outputs of the plurality of laser sensors 150 such that the baggage and positioning of the baggage is associated with video content to further assist with identifying owners of the baggage and items.

Following, based on the mapping, the one or more processors 160 output data indicative of occupied space in the overhead bin 180*a*.

Thus, the processors 160 use outputs from the plurality of laser sensors 150, from the camera 197, or from both the plurality of laser sensors 150 and the camera 197 to generate a mapping of baggage or items in the overhead bins 180*a*. In addition, outputs from the camera 197 are associated in a time-based manner with outputs from the plurality of laser sensors 150 for further correlation of data to assist with identification of baggage to passengers.

Figure 14:
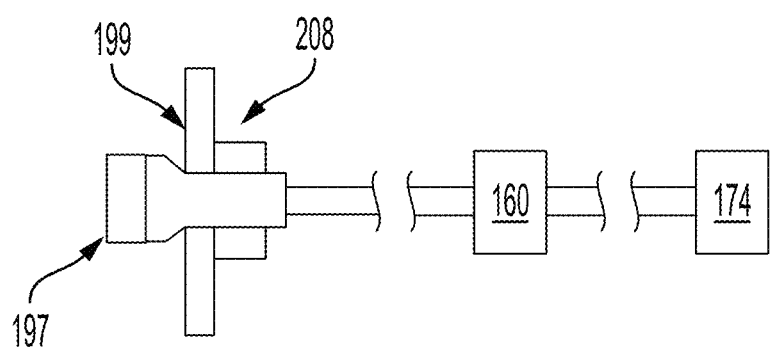
FIG. 14 illustrates a block diagram of an example operation of the camera, according to an example implementation.

FIG. 14 illustrates a block diagram of an example operation of the camera 197, according to an example implementation. In FIG. 14, the camera 197 is positioned in a front wall 199 of the overhead bin 180*a* using the retainer 208. The overhead bin 180*a* includes a door, which when opened, exposes the front wall 199. For example, the camera 197 can be attached or may be fastened to the front wall 199 by threads and the retainer 208 may be a nut to secure the camera 197 to the front wall 199. The camera 197 outputs digital images to the processors 160, via wires or via a wireless output (when a transmitter is coupled to the camera 197), and the processor 160 generates the mapping of contents in the overhead bin 180*a*. The processors 160 then can provide the data indicative of occupied space in the overhead bin 180*a* to the display 174, for example. The processors 160 also store the digital images from the camera 197 in a video storage unit (e.g., the non-transitory computer readable media 164), for example.

Figure 15:
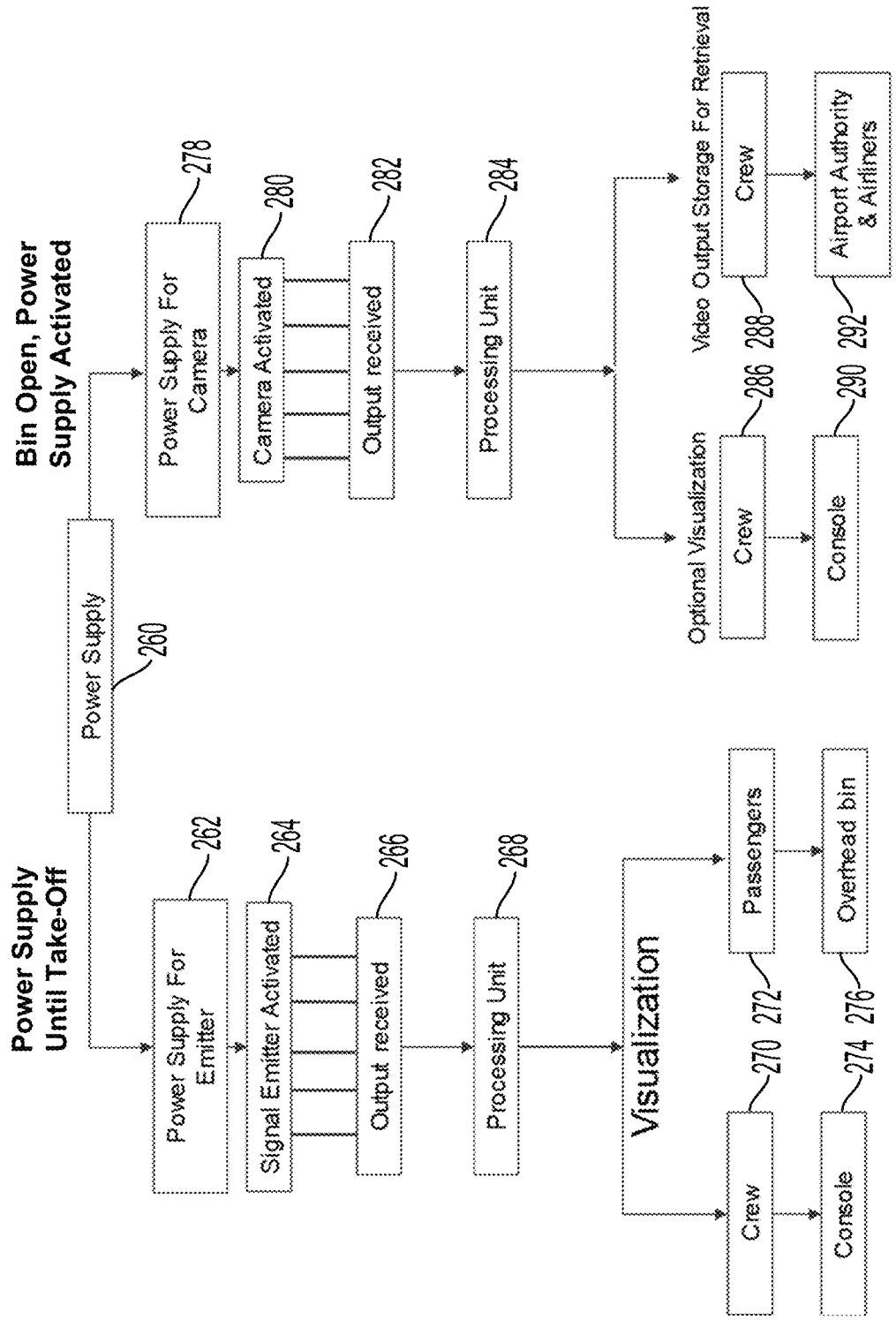
FIG. 15 is a block diagram illustrating a flowchart of example operation of the camera, according to an example implementation.

FIG. 15 is a block diagram illustrating a flowchart of example operation of the camera 197, according to an example implementation. Initially, a power supply is coupled to the laser sensor 206, and the laser sensor 206 is activated until take-off, as shown at blocks 260 and 262. One or more laser beams are emitted, and outputs (e.g., reflected responses) are received, as shown at blocks 264 and 266. The laser sensor 206 then provides an output to the processors 160, at block 268, and the processors 160 generate data indicative of occupied space in the overhead bin 180*a* for visualization to crew members (at block 270) and to passengers (at block 272). Visualization to the crew members can be via a console, as shown at block 274. Visualization to the passengers can be via a display on the overhead bin 180*a*, as shown at block 276.

Simultaneously, the power supply is coupled to the camera 197, and the camera 197 is activated when the bin is open, as shown at blocks 260 and 278. The camera 197 is activated and provides digital image outputs, as shown at blocks 280 and 282. The processors 160 receive the digital images, at block 284. In one example, the processors 160 use the digital images to generate data indicative of occupied space in the overhead bin 180*a* for visualization to crew members (at block 286) and to store in data storage (at block 288). In one example, the camera 197 is positioned to capture images of an internal volume of the overhead bin 180*a* and the processors 160 perform image processing to identify objects in the captured images positioned in the overhead bin 180*a*. In another example, the camera 197 is provided with a wide-angle lens to capture images containing at least a portion of an internal volume of the overhead bin 180*a* so that the images are processed to identify objects positioned in the overhead bin 180*a*. Visualization to the crew members can be via a console, as shown at block 290. Storage is accessible by airport authority and airliners, as shown at block 292.

In sum, the laser beams from the laser sensor 206 (and from all sensors of the plurality of laser sensors) pass through the overhead baggage bins, and the laser sensors in turn capture information of baggage in each compartment, measure dimensions of the baggage, and provide outputs to the processors to analyze space availability. Simultaneously, the camera 197 captures images of an internal volume of the overhead bin 180*a*, a passenger placing the baggage into the overhead bin 180*a* (i.e., an outward facing viewpoint from the overhead bin 180*a*), or both to provide images to the processors to analyze space availability.

Information representing the space availability can be illustrated in real time on a digital monitor, for example.

Figure 16:
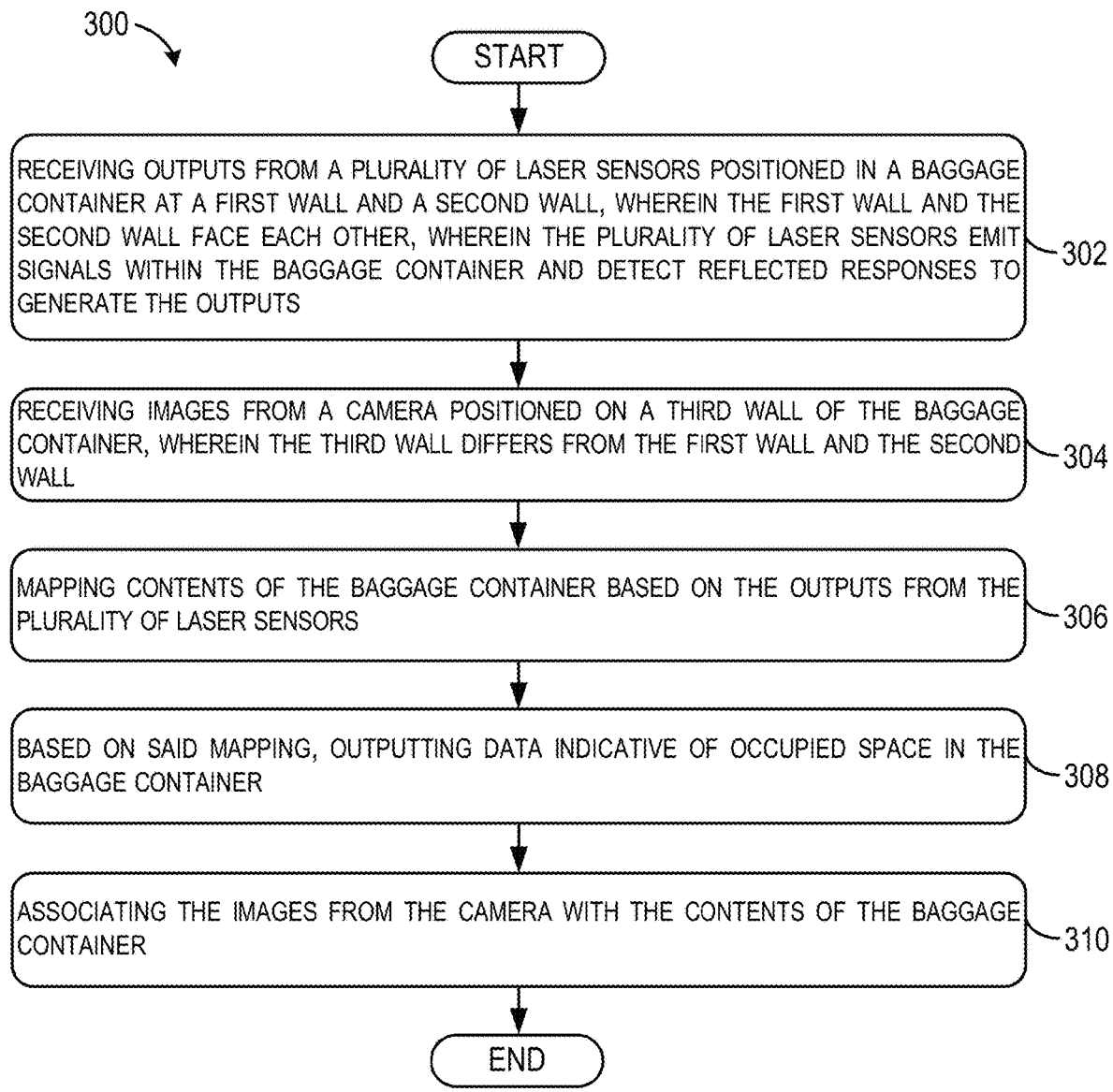
FIG. 16 shows a flowchart of an example of another method for determining space availability in an aircraft, according to an example implementation.

FIG. 16 shows a flowchart of an example of a method 300 for determining space availability in an aircraft, according to an example implementation. Method 300 shown in FIG. 16 presents an example of a method that could be used with the aircraft 100 shown in FIG. 1, with the system shown in FIGS. 13 and 14, or with the computing device 166 shown in FIG. 2, for example. Further, devices or systems may be used or configured to perform logical functions presented in FIG. 16. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 16, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 302, the method 300 includes receiving outputs from a plurality of laser sensors positioned in a baggage container at a first wall and a second wall, and the first wall and the second wall face each other. The plurality of laser sensors emit signals within the baggage container and detect reflected responses to generate the outputs.

At block 304, the method 300 includes receiving images from a camera positioned on a third wall of the baggage container, and the third wall differs from the first wall and the second wall.

At block 306, the method 300 includes mapping contents of the baggage container based on the outputs from the plurality of laser sensors.

At block 308, the method 300 includes based on said mapping, outputting data indicative of occupied space in the baggage container.

At block 310, the method 300 includes associating the images from the camera with the contents of the baggage container.

In one example, the baggage container includes a door, and the method 300 also includes activating the camera upon opening the door of the baggage container.

In another example, the method 300 further includes associating the images from the camera with the contents of the baggage container based on a time of capture of the images with a time of mapping of the contents.

In another example, the method 300 further includes mapping the contents of the baggage container at a position in the baggage container based on the outputs from the plurality of laser sensors.

In another example, the method 300 further includes mapping the contents of the baggage container at a position in the baggage container based on the outputs from the plurality of laser sensors at a point in time, and based on the mapping, associating the images from the camera received at the point in time with the position in the baggage container.

Figure 17:
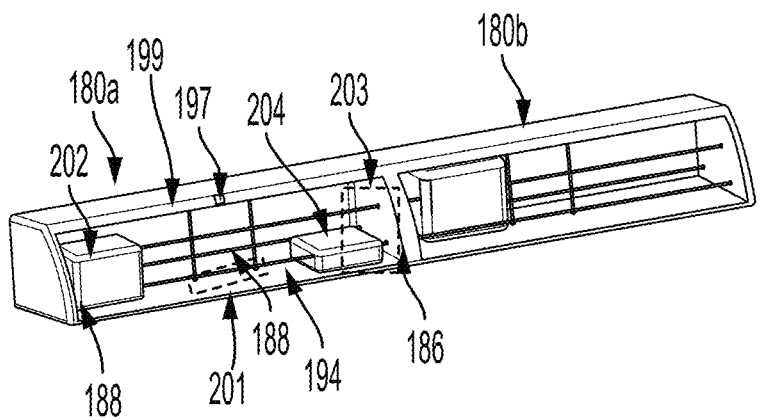
FIG. 17 illustrates another example of the overhead bins with the doors in an open position (and not shown) and with contents positioned inside the overhead bins, according to an example implementation.

FIG. 17 illustrates another example of the overhead bins 180*a-b* with the doors 184*a-b* in an open position (and not shown) and with contents positioned inside the overhead bins 180*a-b*, according to an example implementation. In this example arrangement, the plurality of laser sensors 150 (and other groups of laser sensors, if present, such as the second plurality of laser sensors 192) are replaced with passive infrared and active infrared sensors. For example, passive infrared sensors 201 are installed on a floor or ceiling of the overhead bin 180*a* and active infrared sensors 203 are installed on (or in) one of the opposing side walls. The passive infrared sensors 201 and the active infrared sensors 203 are installed on (or in) walls of the overhead bin 180*a* using attachment mechanisms similar to that as described for the laser sensors in FIG. 8 and the camera in FIG. 14, for example.

In the example arrangement shown in FIG. 17, the camera 197 is also installed on the overhead bin 180*a*. Although FIG. 17 only illustrates one camera, more than one camera is arranged on walls of the overhead bins 180*a* in other examples, such as to arrange one or more additional cameras on other walls (e.g., internal walls of the overhead bin 180*a*) or facing alternate directions.

Within examples, the passive infrared sensors 201, map a heat signature of contents positioned in the overhead bins 180*a* to a position in the overhead bin 180*a*, such as to identify any battery overheating or any abnormal heating in the overhead bin 180*a*. The active infrared sensors 203 operate similar to the plurality of lasers 150, so as to generate a mapping of a shape/size/volume occupied in the overhead bin 180*a*. The camera 197 operates similar as described above, for example.

Thus, within one example, in operation, when the instructions 162 are executed by the one or more processors 160 of the computing device 166, the one or more processors 160 are caused to perform functions similar to those described above, and also for additionally receiving outputs from the passive infrared sensors 201 and the active infrared sensors 203, and then to associate the outputs with the contents positioned in the overhead bins 180*a-b*.

Following, based on the mapping, the one or more processors 160 output data indicative of occupied space in the overhead bin 180*a*, as well as which contents (if any) have identified heat mappings for example.

Thus, the processors 160 use outputs from the passive infrared sensors 201, the active infrared sensors 203, from the camera 197, or from all of the passive infrared sensors 201, the active infrared sensors 203, and the camera 197 to generate a mapping of baggage or items in the overhead bins 180*a*. In addition, outputs from the camera 197 are associated in a time-based manner with outputs from the passive infrared sensors 201 and the active infrared sensors 203 for further correlation of data to assist with identification of baggage to passengers.

Figure 18:
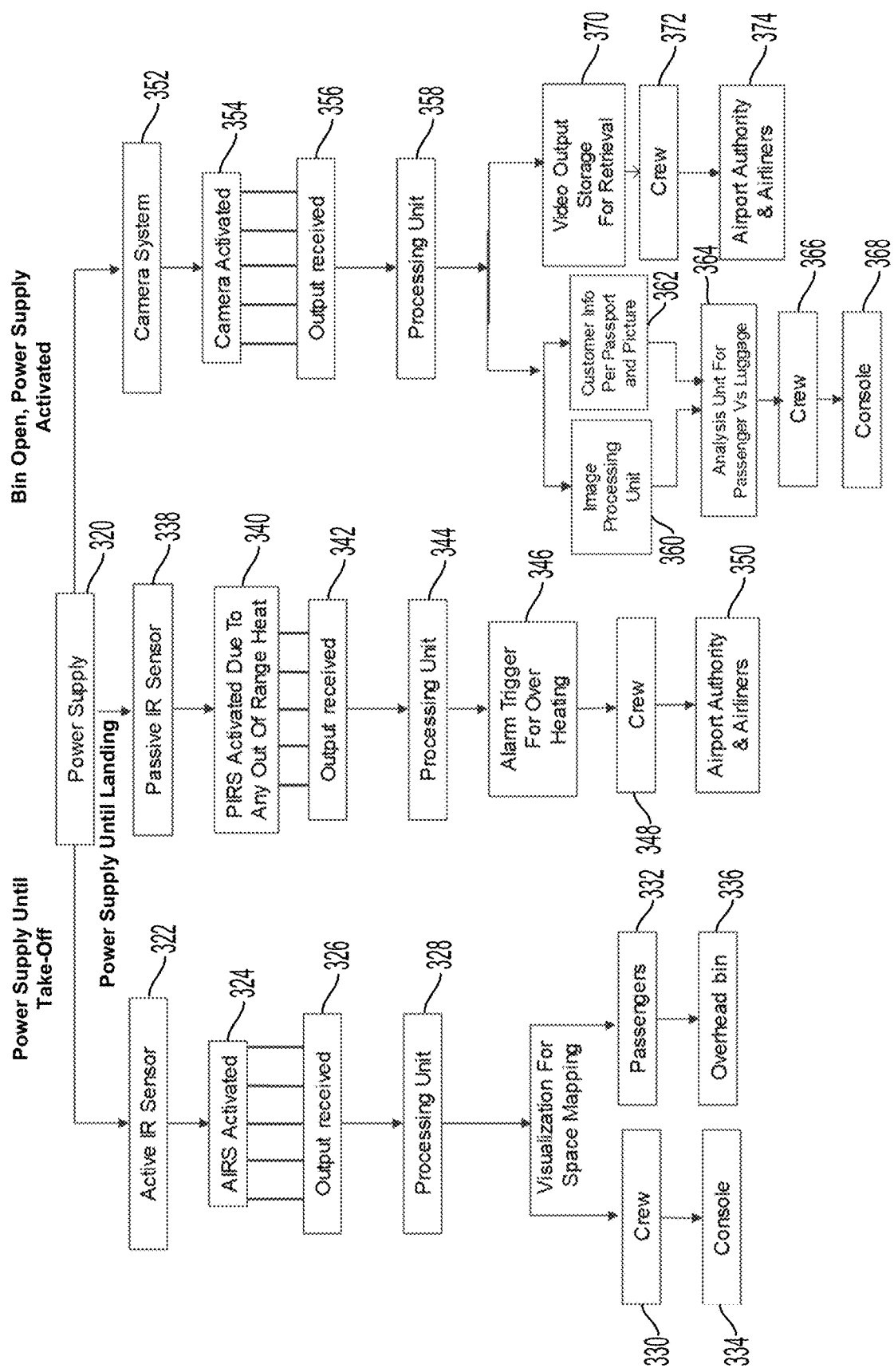
FIG. 18 is a block diagram illustrating a flowchart of example operation of the passive infrared sensors, the active infrared sensors, and the camera arrangement, according to an example implementation.

FIG. 18 is a block diagram illustrating a flowchart of example operation of the passive infrared sensors 201, the active infrared sensors 203, and the camera 197 arrangement, according to an example implementation. Initially, a power supply is coupled to the active infrared sensors 203 for activation until take-off, as shown at blocks 320 and 322. The active infrared sensors 203 are operated to generate outputs, as shown at blocks 324 and 326. The active infrared sensors 203 then provide the outputs to the processors 160, at block 328, and the processors 160 generate data indicative of occupied space in the overhead bin 180*a* for visualization to crew members (at block 330) and to passengers (at block 332). Visualization to the crew members can be via a console, as shown at block 334. Visualization to the passengers can be via a display on the overhead bin 180*a*, as shown at block 336.

Simultaneously, the power supply is coupled to the passive infrared sensors 201 for activation until landing of the aircraft (e.g., during boarding, take-off, and in-flight the passive infrared sensors 201 are activated), as shown at blocks 320 and 338. The passive infrared sensors 201 are activated based on detection of heat above a threshold amount and generate outputs, as shown at blocks 340 and 342. The processors 160 receive the outputs, at block 344. In one example, the processors 160 use the outputs as a basis for triggering an alarm for over-heating within an overhead bin, as shown at block 346. The alarm is output by the processors 160 for visualization to crew members (at block 348) and to store in data storage (at block 350) to send to the airport authority and airliners.

In addition, for further simultaneous operation, in FIG. 18, the power supply is coupled to the camera 197, and the camera 197 is activated when the bin is open, as shown at blocks 320 and 352. The camera 197 is activated and provides digital image outputs, as shown at blocks 354 and 356. The processors 160 receive the digital images, at block 358. In one example, the processors 160 use the digital images to generate data indicative of occupied space in the overhead bin 180*a* by analysis by an image processing unit (at block 360) and to associate the identified baggage with customer or passenger information (at block 362) based on identification of passengers in the images. The baggage is then associated with a passenger, at block 364, and such information is provided for visualization to crew members (at block 366), such as via a console at (block 368). In addition, the processors 160 output images captured by the camera 197 to video output storage (at block 370) for access by crew members (at block 372) and by airport authority and airliners (at block 374).

Figure 19:
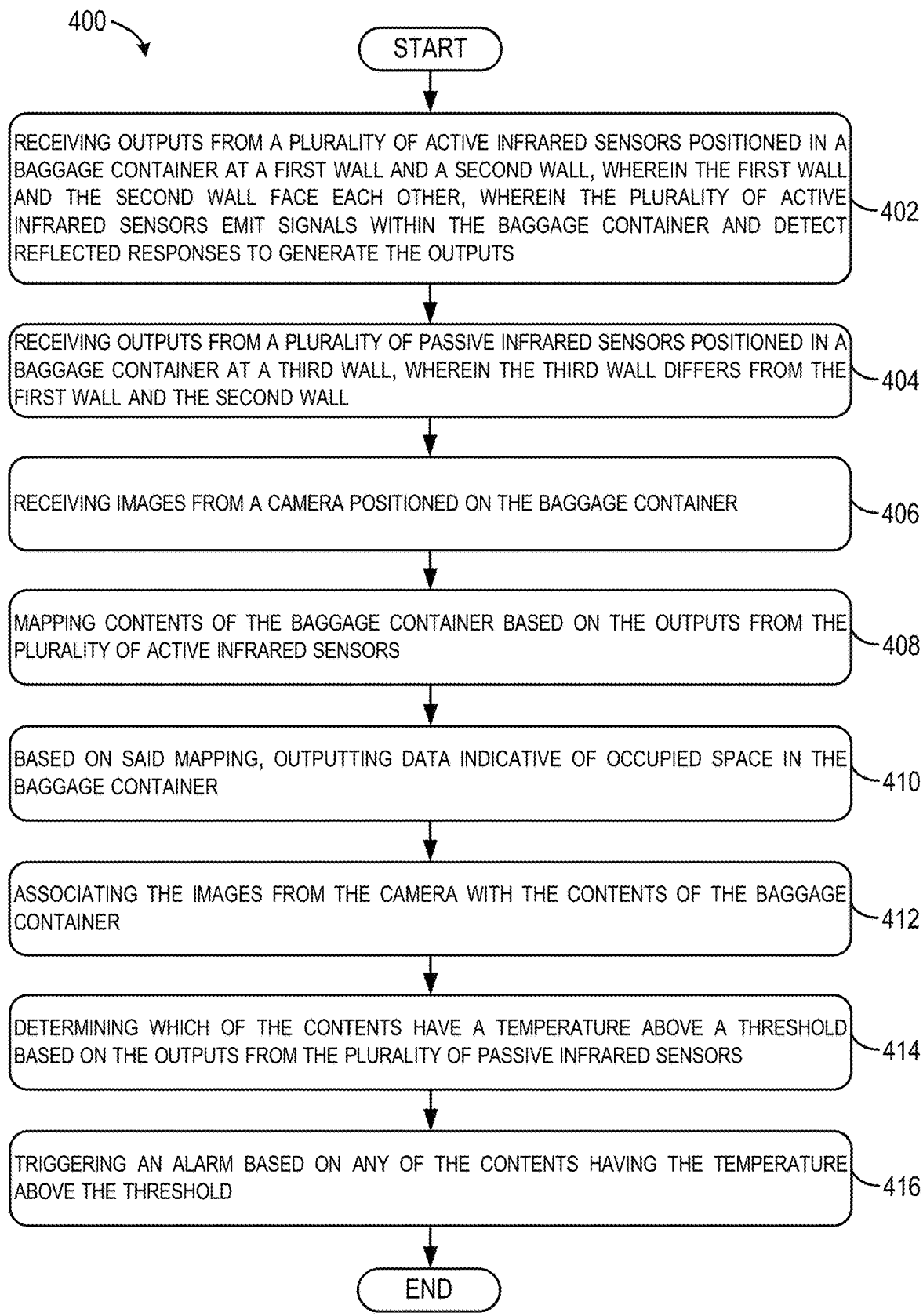
FIG. 19 shows a flowchart of another example of a method for determining space availability in an aircraft, according to an example implementation.

FIG. 19 shows a flowchart of an example of a method 400 for determining space availability in an aircraft, according to an example implementation. Method 400 shown in FIG. 19 presents an example of a method that could be used with the aircraft 100 shown in FIG. 1, with the system shown in FIGS. 17 and 18, or with the computing device 166 shown in FIG. 2, for example. Further, devices or systems may be used or configured to perform logical functions presented in FIG. 19. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-416. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 19, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, the method 400 includes receiving outputs from a plurality of active infrared sensors positioned in a baggage container at a first wall and a second wall, and the first wall and the second wall face each other. The plurality of active infrared sensors emit signals within the baggage container and detect reflected responses to generate the outputs.

At block 404, the method 400 includes receiving outputs from a plurality of passive infrared sensors positioned in a baggage container at a third wall, and the third wall differs from the first wall and the second wall.

At block 406, the method 400 includes receiving images from a camera positioned on the baggage container.

At block 408, the method 400 includes mapping contents of the baggage container based on the outputs from the plurality of active infrared sensors.

At block 410, the method 400 includes based on said mapping, outputting data indicative of occupied space in the baggage container.

At block 412, the method 400 includes associating the images from the camera with the contents of the baggage container.

At block 414, the method 400 includes determining which of the contents have a temperature above a threshold based on the outputs from the plurality of passive infrared sensors.

At block 416, the method 400 includes triggering an alarm based on any of the contents having the temperature above the threshold. In some examples, the alarm is associated with one of the contents in the baggage container having the temperature above the threshold. In further examples, the method 400 also includes associating the alarm with the images from the camera captured at a point in time that the alarm was triggered.

In still further examples, the method 400 includes associating the contents having the temperature above the threshold with the images from the camera captured at a point in time that the contents were mapped to the baggage container.

In still further examples, the method 400 includes mapping the contents of the baggage container to a specific location in the baggage container.

Figure 20:
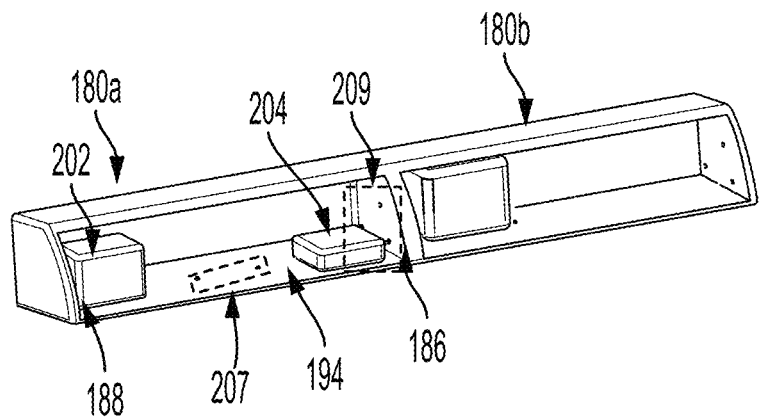
FIG. 20 illustrates another example of the overhead bins with the doors in an open position (and not shown) and with contents positioned inside the overhead bins, according to an example implementation.

FIG. 20 illustrates another example of the overhead bins 180a-b with the doors 184a-b in an open position (and not shown) and with contents positioned inside the overhead bins 180a-b, according to an example implementation. In the arrangement shown in FIG. 20, the plurality of laser sensors 150 and the camera 197 are replaced with a different type of sensor. For example, the overhead bins 180a-b are shown to include linear variable differential transducers (LVDT) 207 and 209 on sidewalls and on the base and/or ceiling. The arrangement in FIG. 20 is a mechanical or electro-mechanical mapping system to determine occupied and unoccupied space in the overhead bins 180a-b.

Figure 21:
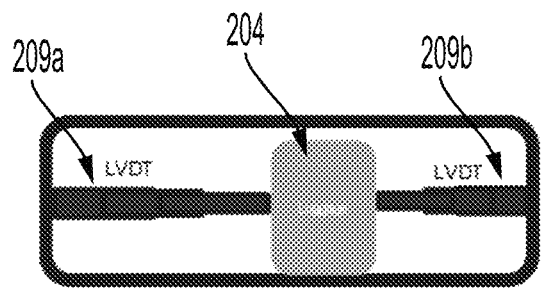
FIG. 21 illustrates an example configuration of a linear variable differential transducer (LVDT) in the overhead bin, according to an example implementation.

FIG. 21 illustrates an example configuration of an LVDT in the overhead bin. The LVDT shown in FIG. 21 is representative of the LVDT 207 located in a base or ceiling of the overhead bin 180a as well as the LVDT 209 located in a side wall of the overhead bin 180a. For the example shown in FIG. 21, reference is made to the LVDT 209 located in the side wall. For example, upon placement of the briefcase 204 in the overhead bin 180a, an LVDT 209a and an LVDT 209b measure a displacement or distance to the briefcase through electro-mechanical operation. The LVDT 209a and 209b will contact the briefcase 204 and provide outputs to the processors 160 of the distance from the wall to the briefcase.

Figure 22:
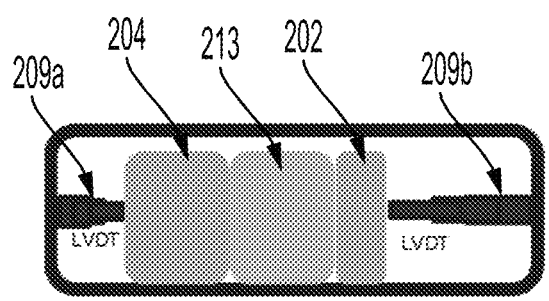
FIG. 22 illustrates another example configuration in which the container and another item are positioned in the overhead bin, according to an example implementation.

FIG. 22 illustrates another example configuration in which the container 202 and another item 213 are positioned in the overhead bin 180a. Upon placement of the items, the LVDT 209a and 209b are operated to measure the displacement or distance to a nearest content, such as the LVDT 209a contacting the briefcase 204 and the LVDT 209b contacting the container. The LVDT 209a and the LVDT 209b will provide outputs to the processors 160 of the measured or determined distances. Following, the processors 160 determine a mapping of occupied and unoccupied space in the overhead bin 180a, and the one or more processors 160 output data indicative of occupied space in the overhead bin 180a.

Thus, the LVDT 207 and 209 are operable to measure a distance to items positioned in the overhead bins 180a-b, and the processors 160 use outputs from the LVDT 207 and 209 to generate a mapping of baggage or items in the overhead bins 180a.

Figure 23:
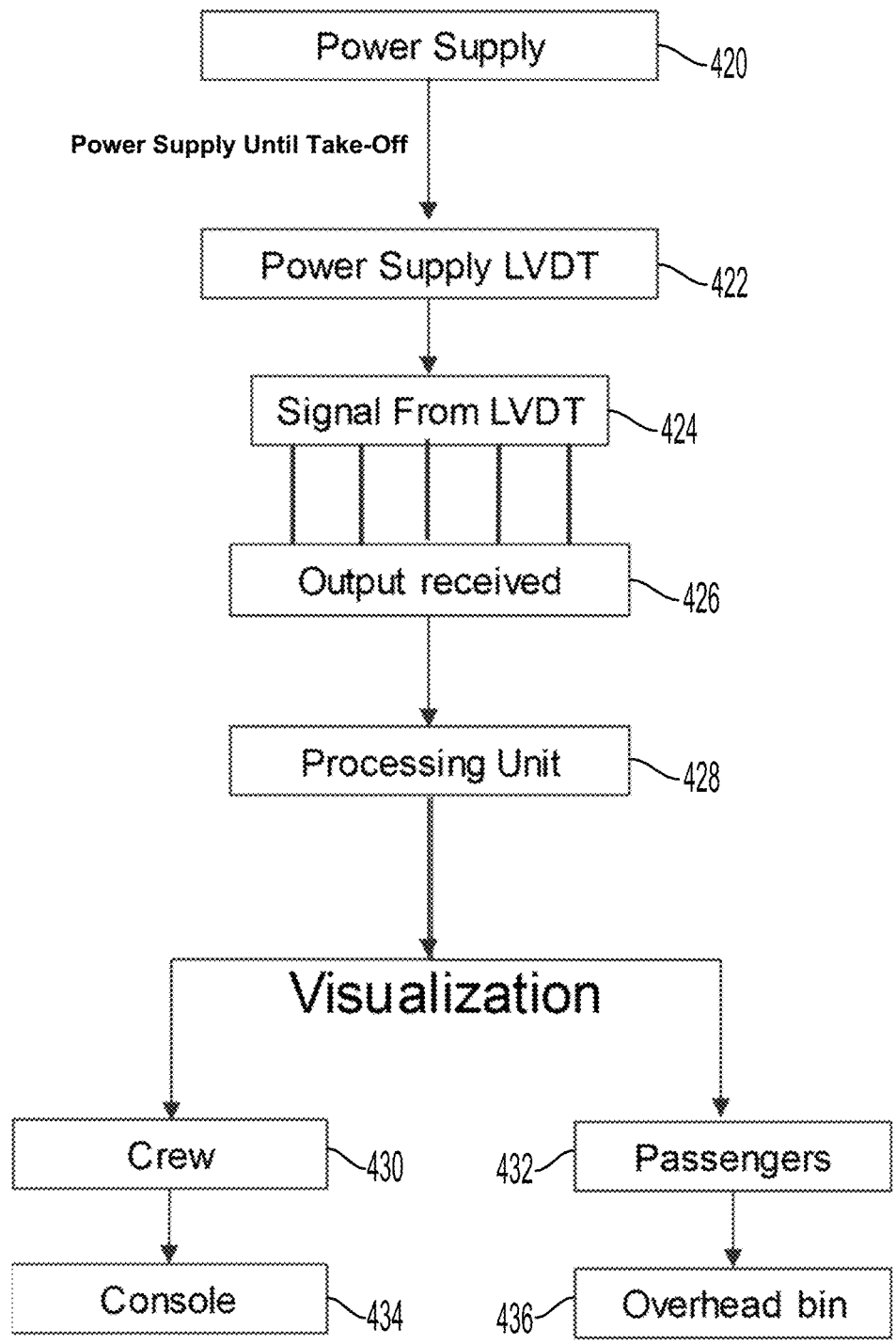
FIG. 23 illustrates a block diagram of an example operation of the linear variable differential transducer (LVDT) and, according to an example implementation.

FIG. 23 illustrates a block diagram of an example operation of the LVDT 207 and 209, according to an example implementation. Initially, a power supply is coupled to the LVDT 207 and 209, and the LVDT 207 and 209 are activated until take-off, as shown at blocks 420 and 424. The LVDT 207 and 209 makes a measurement of displacement and outputs signals to the processors 160, as shown at blocks 424, 426, and 428. The processors 160 generate data indicative of occupied space in the overhead bin 180a for visualization to crew members (at block 430) and to passengers (at block 432). Visualization to the crew members can be via a console, as shown at block 434. Visualization to the passengers can be via a display on the overhead bin 180a, as shown at block 436.

Figure 24:
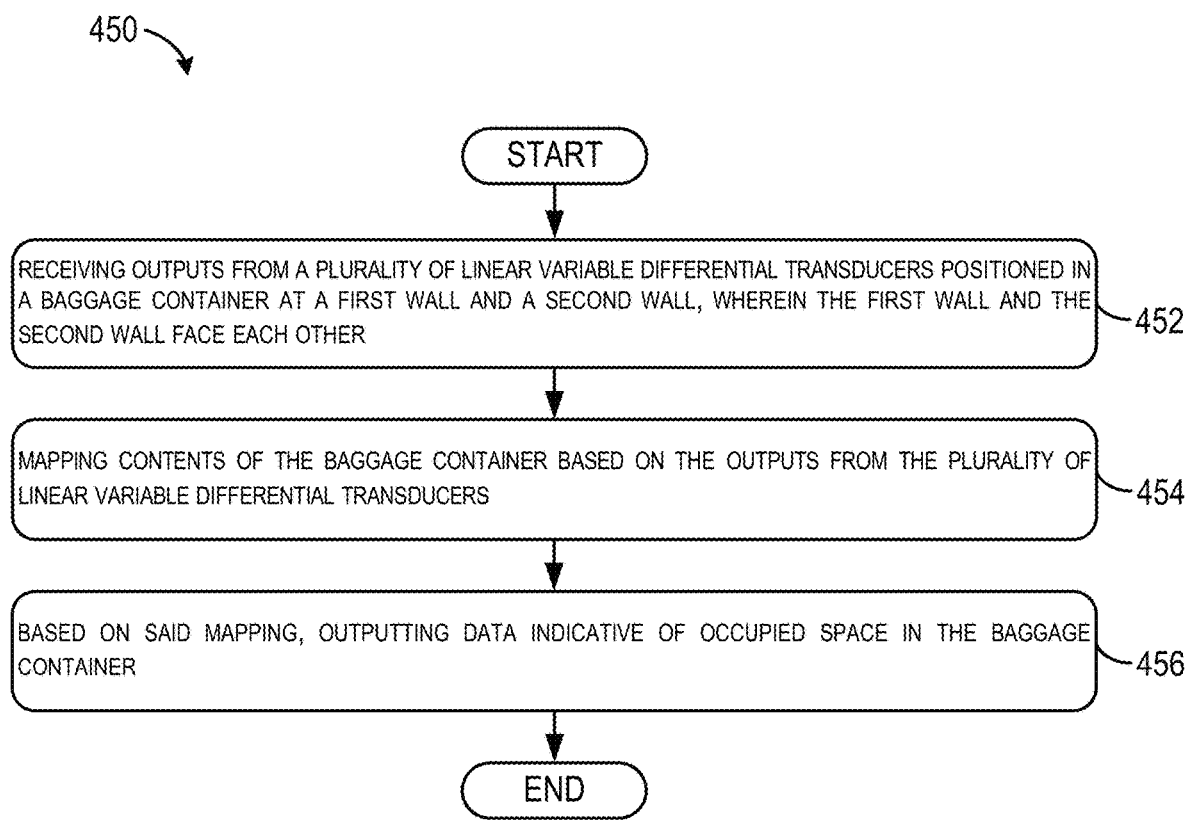
FIG. 24 shows a flowchart of another example of a method for determining space availability in an aircraft, according to an example implementation.

FIG. 24 shows a flowchart of an example of a method 450 for determining space availability in an aircraft, according to an example implementation. Method 450 shown in FIG. 24 presents an example of a method that could be used with the aircraft 100 shown in FIG. 1, with the system shown in FIGS. 20-23, or with the computing device 166 shown in FIG. 2, for example. Further, devices or systems may be used or configured to perform logical functions presented in FIG. 24. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 450 may include one or more operations, functions, or actions as illustrated by one or more of blocks 452-456. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 24, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 452, the method 450 includes receiving outputs from a plurality of linear variable differential transducers positioned in a baggage container at a first wall and a second wall, and the first wall and the second wall face each other. The LVDT can be positioned on any of the walls of the baggage container, for example.

At block 454, the method 450 includes mapping contents of the baggage container based on the outputs from the plurality of linear variable differential transducers.

At block 456, the method 450 includes based on said mapping, outputting data indicative of occupied space in the baggage container.

In further examples, the method 450 includes operating the LVDT sensors based on closing a door of the baggage containers. In this manner, the mapping occurs when the doors are closed, and crew members can determine which, if any, of the overhead bins still have available space. The overhead bins may include sensors, as described herein, coupled to the doors or latches of the doors to provide outputs to trigger operation of the LVDT, for example.

Still further, outputs of any types of sensors or cameras and number of sensors or cameras described herein are used in any combination, within further examples, to increase data associated with positioning of baggage and items in the overhead bins 180*a-b*. Such data may, for example, improve accuracy of the mapping of items in the overhead bins 180*a-b* as well as improve or enable association of the baggage and items to passengers in the aircraft.

Note that although this disclosure has described use of the methods and systems for use on aircraft, the same functions apply equally to use of the methods and system on board any type of vehicle in order to determine space availability of containers or different areas (such as within automobiles, boats, etc.). The methods and systems can also find use within non-vehicles or stationary areas to determine space availability of containers or different objects, for example. Moreover, the methods and systems can be implemented in any area used for storage to enhance space utilization, including other vehicles and structures.

The methods and systems described herein helps crew members to easily determine available space in bins and allocate baggage accordingly to ensure on-time flight take-off. The systems and methods further can reduce on-boarding time, reduce efforts by crew to find baggage space, enhance safety of baggage stowage for passengers by not over-loading baggage containers, and improves customer experience.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system comprising:
   a plurality of active infrared sensors positioned in a baggage container at a first wall and a second wall, and the first wall and the second wall face each other, wherein the plurality of active infrared sensors emit signals within the baggage container and detect reflected responses to generate outputs;
   a plurality of passive infrared sensors positioned in a baggage container at a third wall, and the third wall differs from the first wall and the second wall;
   a camera positioned on the baggage container; and
   one or more processors in communication with the plurality of active infrared sensors, the plurality of passive infrared sensors, and the camera for executing instructions stored in non-transitory computer readable media to perform functions including:
receiving the outputs from the plurality of active infrared sensors;
receiving outputs from the plurality of passive infrared sensors;
receiving images from the camera;
mapping contents of the baggage container based on the outputs from the plurality of active infrared sensors;
based on said mapping, outputting data indicative of occupied space in the baggage container;
associating the images from the camera with the contents of the baggage container;
determining which of the contents have a temperature above a threshold based on the outputs from the plurality of passive infrared sensors; and
triggering an alarm based on any of the contents having the temperature above the threshold.

2. The system of claim 1, wherein the plurality of passive infrared sensors are positioned on a floor or a ceiling of the baggage container.

3. The system of claim 1, wherein the baggage container includes side walls, and wherein the plurality of active infrared sensors are positioned on one of the side walls of the baggage container.

4. The system of claim 1, wherein the baggage container includes a door, and the functions further comprise:
activating the camera upon opening the door of the baggage container.

5. The system of claim 1, wherein the functions further comprise:
associating the images from the camera with the contents of the baggage container based on a time of capture of the images with a time of mapping of the contents.

6. The system of claim 1, wherein the baggage container includes an overhead bin in the aircraft.

7. The system of claim 1, wherein the functions further comprise:
mapping a heat signature of the contents of the baggage container to a position in the baggage container.

8. The system of claim 1, wherein the functions further comprise:
mapping the contents of the baggage container at a position in the baggage container based on the outputs from the plurality of active infrared sensors.

9. The system of claim 1, wherein the functions further comprise:
mapping the contents of the baggage container at a position in the baggage container based on the outputs from the plurality of active infrared sensors at a point in time; and
based on the mapping, associating the images from the camera received at the point in time with the position in the baggage container.

10. The system of claim 1, further comprising:
a display mounted proximal to the baggage container, and wherein the functions further comprise displaying one or more indicators of the occupied space in the baggage container on the display based on the data indicative of occupied space in the baggage container.

11. The system of claim 1, wherein the functions further comprise:
activating the plurality of active infrared sensors before take-off and after landing of the aircraft.

12. The system of claim 1, wherein the functions further comprise:
receiving a weight on wheel sensor output; and
based on the weight on wheel sensor output, activating or deactivating the plurality of active infrared sensors.

13. The system of claim 1, wherein the baggage container includes an overhead bin in the aircraft with a door, and wherein the functions further comprise:
activating the plurality of active infrared sensors only when the door is open.

14. The system of claim 1, further comprising:
one or more weight sensors positioned at a base of the baggage container for providing an output to the one or more processors indicative of presence of an object in the baggage container, and
wherein mapping the contents of the baggage container further comprises mapping the contents of the baggage container based on the output from the one or more weight sensors.

15. A method comprising:
receiving outputs from a plurality of active infrared sensors positioned in a baggage container at a first wall and a second wall, and the first wall and the second wall face each other, wherein the plurality of active infrared sensors emit signals within the baggage container and detect reflected responses to generate the outputs;
receiving outputs from a plurality of passive infrared sensors positioned in a baggage container at a third wall, and the third wall differs from the first wall and the second wall;
receiving images from a camera positioned on the baggage container;
mapping contents of the baggage container based on the outputs from the plurality of active infrared sensors;
based on said mapping, outputting data indicative of occupied space in the baggage container;
associating the images from the camera with the contents of the baggage container;
determining which of the contents have a temperature above a threshold based on the outputs from the plurality of passive infrared sensors; and
triggering an alarm based on any of the contents having the temperature above the threshold.

16. The method of claim 15, further comprising:
associating the alarm with the images from the camera captured at a point in time that the alarm was triggered.

17. The method of claim 15, further comprising:
associating the contents having the temperature above the threshold with the images from the camera captured at a point in time that the contents were mapped to the baggage container.

18. The method of claim 15, further comprising:
mapping the contents of the baggage container to a specific location in the baggage container.

19. The method of claim 15, wherein the baggage container includes a door, and the method further comprises:
activating the camera upon opening the door of the baggage container.

20. A non-transitory computer-readable media having stored therein executable instructions, which when executed by a computing device having one or more processors causes the computing device to perform functions comprising:
receiving outputs from a plurality of active infrared sensors positioned in a baggage container at a first wall and a second wall, and the first wall and the second wall face each other, wherein the plurality of active infrared sensors emit signals within the baggage container and detect reflected responses to generate the outputs;

receiving outputs from a plurality of passive infrared sensors positioned in a baggage container at a third wall, and the third wall differs from the first wall and the second wall;

receiving images from a camera positioned on the baggage container;

mapping contents of the baggage container based on the outputs from the plurality of active infrared sensors;

based on said mapping, outputting data indicative of occupied space in the baggage container;

associating the images from the camera with the contents of the baggage container;

determining which of the contents have a temperature above a threshold based on the outputs from the plurality of passive infrared sensors; and triggering an alarm based on any of the contents having the temperature above the threshold.

* * * * *